(12) United States Patent
Machida

(10) Patent No.: US 12,097,778 B2
(45) Date of Patent: Sep. 24, 2024

(54) ELECTRIC MOTOR VEHICLE

(71) Applicant: HONDA MOTOR CO., LTD., Tokyo (JP)

(72) Inventor: Kei Machida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 917 days.

(21) Appl. No.: 17/256,023

(22) PCT Filed: Jun. 13, 2019

(86) PCT No.: PCT/JP2019/023574
§ 371 (c)(1),
(2) Date: Dec. 24, 2020

(87) PCT Pub. No.: WO2020/004069
PCT Pub. Date: Jan. 2, 2020

(65) Prior Publication Data
US 2021/0170896 A1  Jun. 10, 2021

(30) Foreign Application Priority Data
Jun. 27, 2018 (JP) ................................ 2018-121453

(51) Int. Cl.
*B60L 53/37* (2019.01)
*B60L 53/16* (2019.01)
(Continued)

(52) U.S. Cl.
CPC ............... *B60L 53/37* (2019.02); *B60L 53/16* (2019.02); *B60L 53/305* (2019.02); *B60L 53/36* (2019.02);
(Continued)

(58) Field of Classification Search
CPC ...................................................... B60L 53/68
See application file for complete search history.

(56) References Cited

U.S. PATENT DOCUMENTS 7,999,506 B1 * 8/2011 Hollar ..................... B60L 53/34
320/109
2010/0211272 A1  8/2010 Ichihara
(Continued)

FOREIGN PATENT DOCUMENTS

CN    101821467 A    9/2010
CN    105073467 A    11/2015
(Continued)

OTHER PUBLICATIONS

Office Action issued for counterpart Chinese Application 201980037686.2, issued by the China National Intellectual Property Administration on Sep. 22, 2022.
(Continued)

*Primary Examiner* — Imran K Mustafa

(57) ABSTRACT

There is provide an electric motor vehicle that includes a power storage device, the electric motor vehicle including: a power receiving and feeding outlet configured to enable receiving and feeding of power between the power storage device and a power receiving and feeding apparatus that is provided outside the vehicle; a lid portion driving unit configured to drive a lid portion of the power receiving and feeding outlet; and a communication unit configured to receive a signal from the power receiving and feeding apparatus, the electric motor vehicle being configured to control the drive of the lid portion driving unit in response to the signal from the power receiving and feeding apparatus.

12 Claims, 30 Drawing Sheets

(51) Int. Cl.
*B60L 53/30* (2019.01)
*B60L 53/36* (2019.01)
*B60Q 9/00* (2006.01)
*E04H 6/42* (2006.01)
*E05F 15/40* (2015.01)
*E05F 15/60* (2015.01)
*E05F 15/70* (2015.01)
*H02J 7/00* (2006.01)

(52) U.S. Cl.
CPC ............... *B60Q 9/00* (2013.01); *E04H 6/42* (2013.01); *E05F 15/40* (2015.01); *E05F 15/60* (2015.01); *E05F 15/70* (2015.01); *E05Y 2201/434* (2013.01); *E05Y 2400/40* (2013.01); *E05Y 2400/54* (2013.01); *E05Y 2900/534* (2013.01); *H02J 7/0013* (2013.01)

(56) References Cited

U.S. PATENT DOCUMENTS

| | | | |
|---|---|---|---|
| 2014/0354229 A1* | 12/2014 | Zhao | ............... B60L 53/68 |
| | | | 320/109 |
| 2016/0083981 A1 | 3/2016 | Kondo | |
| 2017/0225583 A1* | 8/2017 | Chai | ............... B60L 53/37 |
| 2018/0300965 A1 | 10/2018 | Mori | |

FOREIGN PATENT DOCUMENTS

| | | |
|---|---|---|
| CN | 108136979 A | 6/2018 |
| CN | 207449645 U | 6/2018 |
| JP | H07236204 A | 9/1995 |
| JP | H07236264 A | 9/1995 |
| JP | 2009249856 A | 10/2009 |
| JP | 2014223837 A | 12/2014 |

OTHER PUBLICATIONS

International Preliminary Report on Patentability for International Application No. PCT/JP2019/023574, issued by the International Bureau of WIPO on Dec. 29, 2020.

\* cited by examiner

800

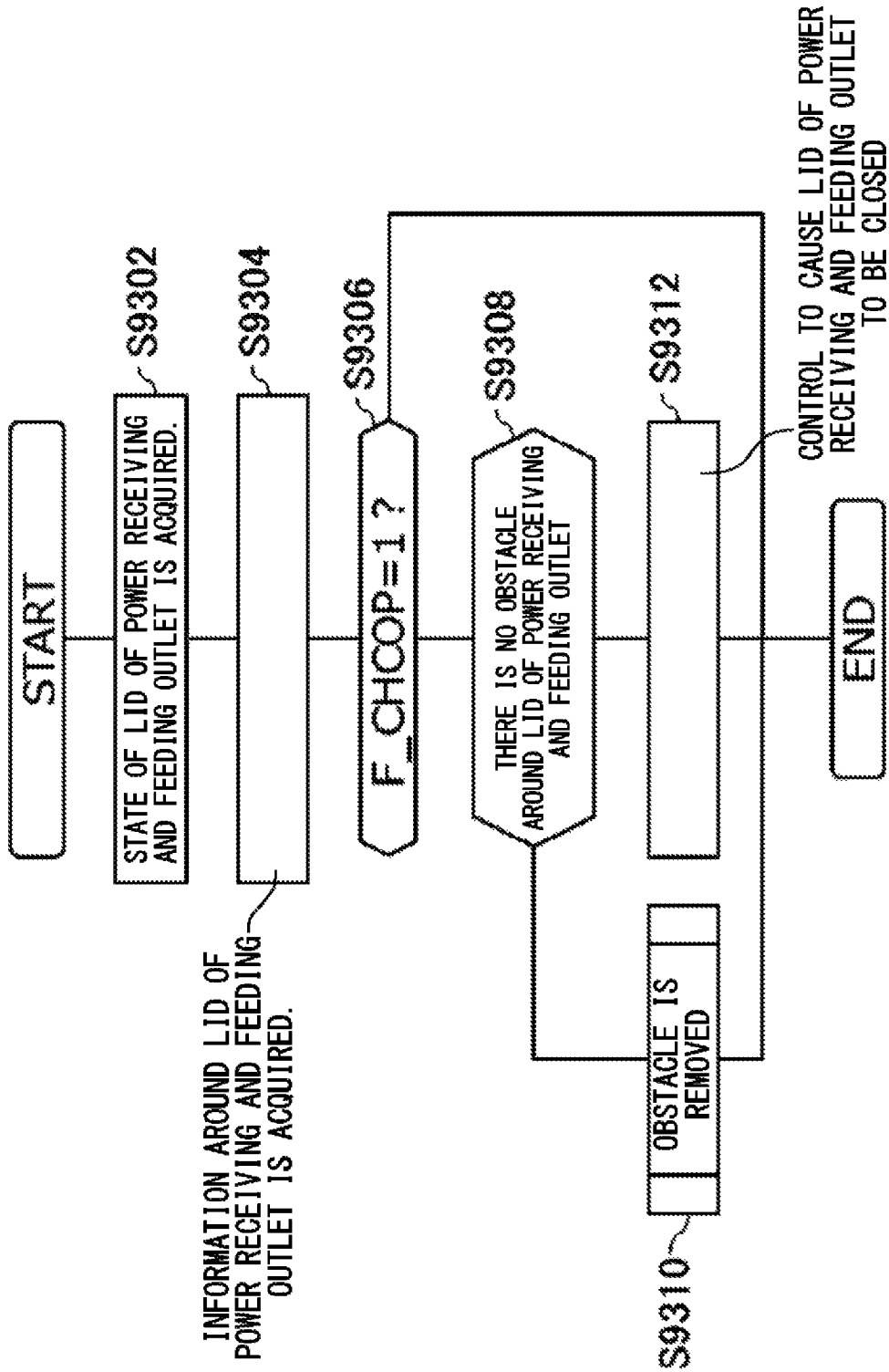

ELECTRIC MOTOR VEHICLE

CROSS-REFERENCE TO RELATED APPLICATIONS

This application is a National Stage Entry of international Application No. PCT/JP2019/023574 filed on Jun. 13, 2019, which claims priority to Japanese Patent application No. 2018-121453 filed on Jun. 27, 2018, the contents of each of which are hereby incorporated by reference in their entirety.

BACKGROUND

1. Technical Field

The present invention relates to an electric motor vehicle.

2. Related Art

A system is known which moves a power feeding connector according to the position of a target object (for example, see Patent Literature 1).

CITATION LIST

Patent Literature

Patent Literature 1: Japanese Patent Application Publication No. 2009-249856

Technical Problem

An electric vehicle secures energy for driving by connecting an external power source to a secondary battery mounted thereon during parking for charging. In order to connect to the external power source, it is necessary to connect a charging connector and a charging port provided in the vehicle. In addition, there has been developed a technique called V2G (Vehicle to Grid) for receiving power by connecting with an external power source regardless of the necessity of charging. Also in this case, it is necessary to connect the charging connector and the charging port provided in the vehicle.

Connecting the charging connector to the charging port of the vehicle is troublesome for a driver, and it is desirable to be automated. In a case where power receiving and feeding is performed by a request such as charging during a normal use, V2G, or the like, the connection frequency is increased, and thus labor saving is desired. Although so-called non-contact charging technology for putting power in and out using a charging pad or the like has also been developed, sufficient results have not been obtained in terms of charging efficiency and cost.

BRIEF DESCRIPTION OF THE DRAWINGS

FIG. 30 schematically illustrates an example of a power receiving and feeding outlet lid closing control process 930.

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential to the solving means of the invention.

Figure 1:
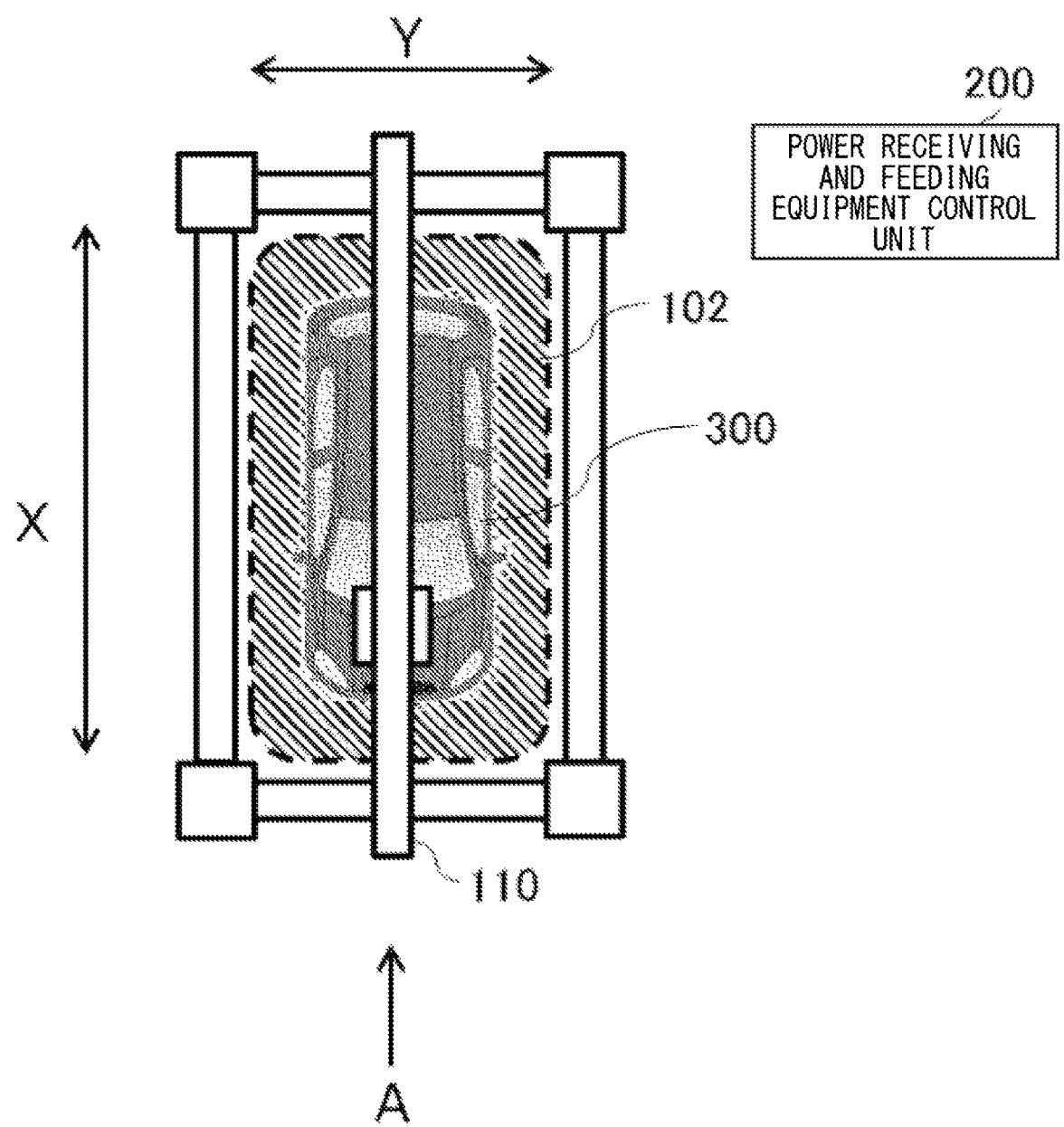
FIG. 1 schematically illustrates an example of power receiving and feeding equipment 100.
Figure 2:
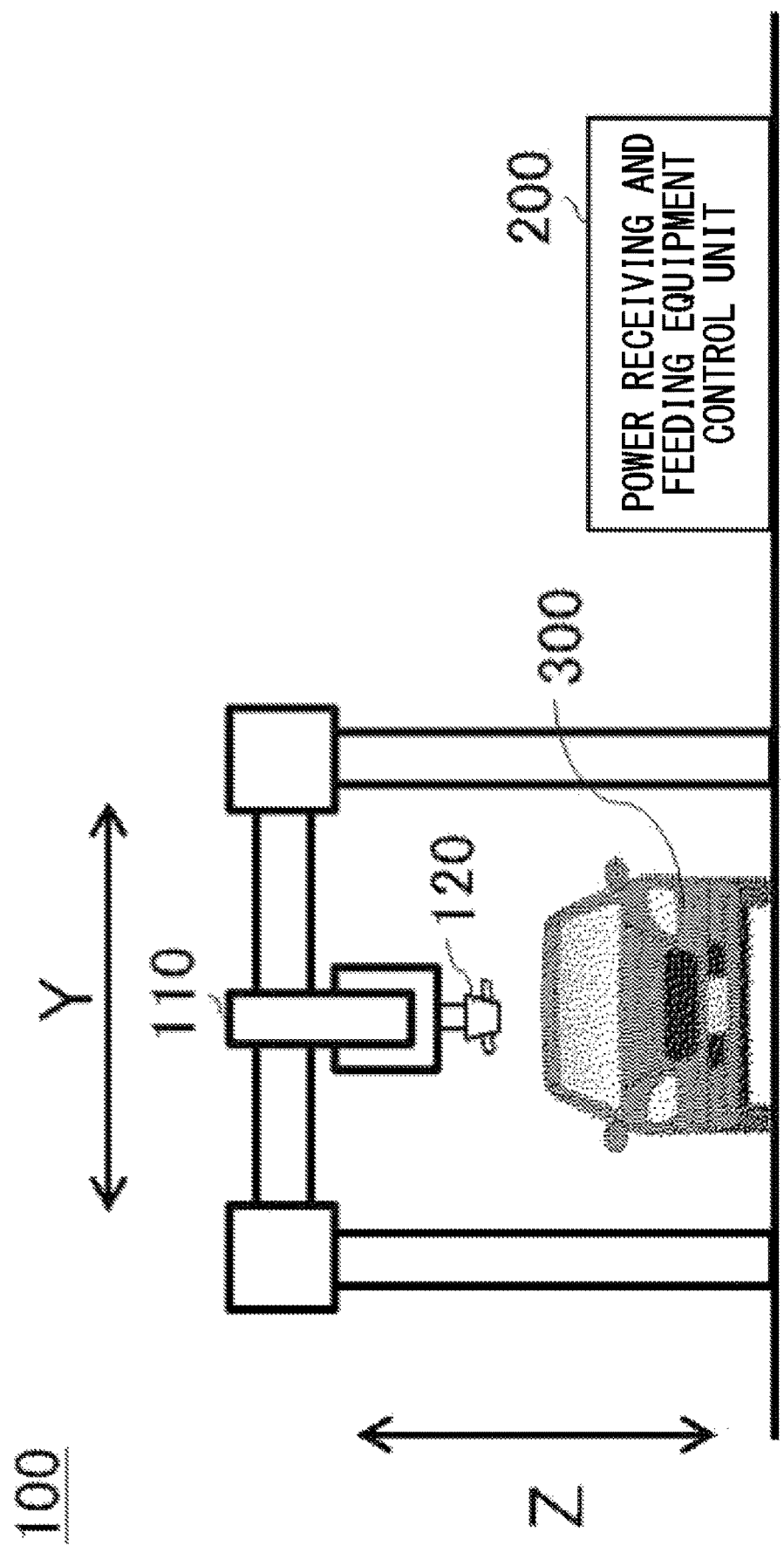
FIG. 2 schematically illustrates an example of the power receiving and feeding equipment 100.

FIGS. 1 and 2 schematically illustrate examples of power receiving and feeding equipment 100. The power receiving and feeding equipment 100 may be an example of a power receiving and feeding apparatus. FIG. 1 is a diagram of the power receiving and feeding equipment 100 viewed from above, and FIG. 2 is a diagram viewed from the horizontal direction indicated by an arrow A as illustrated in FIG. 1. The power receiving and feeding equipment 100 according to the present embodiment includes a connector 120 to be coupled to a power receiving and feeding outlet of a vehicle 300, and a connector moving unit 110 to move the connector 120 in a lateral direction and a vertical direction. The vehicle 300 may be an electric motor vehicle. The electric motor vehicle mentioned herein may be a pure electric vehicle, so-called an EV (Electric Vehicle), and may be an externally chargeable hybrid vehicle, so-called a PHEV (Plug-in Hybrid Electric Vehicle). The X direction and the Y direction illustrated in FIG. 1 may be the lateral directions, and the Z direction may be the vertical direction.

The power receiving and feeding equipment 100 is controlled by a power receiving and feeding equipment control unit 200. The power receiving and feeding equipment control unit 200 may be wire-connected or wirelessly connected to the power receiving and feeding equipment 100.

The power receiving and feeding equipment control unit 200 acquires position information indicating the position of the vehicle 300. In addition, the power receiving and feeding equipment control unit 200 acquires vehicle information of the vehicle 300. The vehicle information includes the dimensions of the vehicle 300, the position of the power receiving and feeding outlet of the vehicle 300, and the like.

The power receiving and feeding equipment control unit 200 determines the position of the power receiving and feeding outlet of the vehicle 300 based on the position information and the vehicle information which are acquired. Then, the power receiving and feeding equipment control unit 200 couples the connector 120 to the power receiving and feeding outlet by causing the connector moving unit 110 to move the connector 120 in the lateral direction at a position higher than a predetermined height, and then to move the connector 120 in the vertical direction, and aligning the connector 120 to the position of the power receiving and feeding outlet. For example, the power receiving and feeding equipment control unit 200 couples the connector 120 to the power receiving and feeding outlet by causing the connector 120 to be moved in the lateral direction at a position higher than a predetermined height, and then to be moved in the vertical direction, aligning the connector 120 to the position of the power receiving and feeding outlet, and then causing the connector moving unit 110 to rotate the connector 120 as needed and to move the connector 120 in the lateral direction. As the predetermined height, a height higher than the height of the vehicle 300 may be set. The power receiving and feeding equipment control unit 200 may be an example of a connection control device that drives the connector 120 so as to control a connection between the connector 120 and the power receiving and feeding outlet of the vehicle 300.

The power receiving and feeding equipment 100 may be capable of feeding power to the vehicle 300 via the connector 120. In addition, the power receiving and feeding equipment 100 may be capable of receiving power from the vehicle 300 via the connector 120. "Power receiving and feeding" may be power feeding to the vehicle 300. In addition, "power receiving and feeding" may be power receiving from the vehicle 300. "Power receiving and feeding" may include both power feeding to the vehicle 300, and power receiving from the vehicle 300. The power receiving and feeding equipment 100 can couple the connector 120 to the vehicle 300 in which the power receiving and feeding outlet is disposed in a power receiving and feeding area 102.

As described above, it is possible to prevent the connector from coming in contact with the vehicle 300 or the like during movement by moving the connector 120 at a position higher than a predetermined height in the lateral direction. In addition, moving the connector 120 in the lateral direction and then in the vertical direction to align the connector 120 to the position of the power receiving and feeding outlet so as to couple the connector 120 to the power receiving and feeding outlet of the vehicle 300 allows the connector 120 to be coupled to the vehicle 300 without manual operations. This can automate the connection to the power receiving and feeding outlet of the connector 120 and thus can reduce the burden on the user of the vehicle 300. Since charging the vehicle 300 is a daily routine, the automation of connection is highly demanded. In addition, a parking lot equipped with this system eliminates annoying manual charging operations, so that the added value of the parking industry can be increased. In addition, this parking lot enables efficiently charging many vehicles 300 with less charging facilities.

Figure 3:
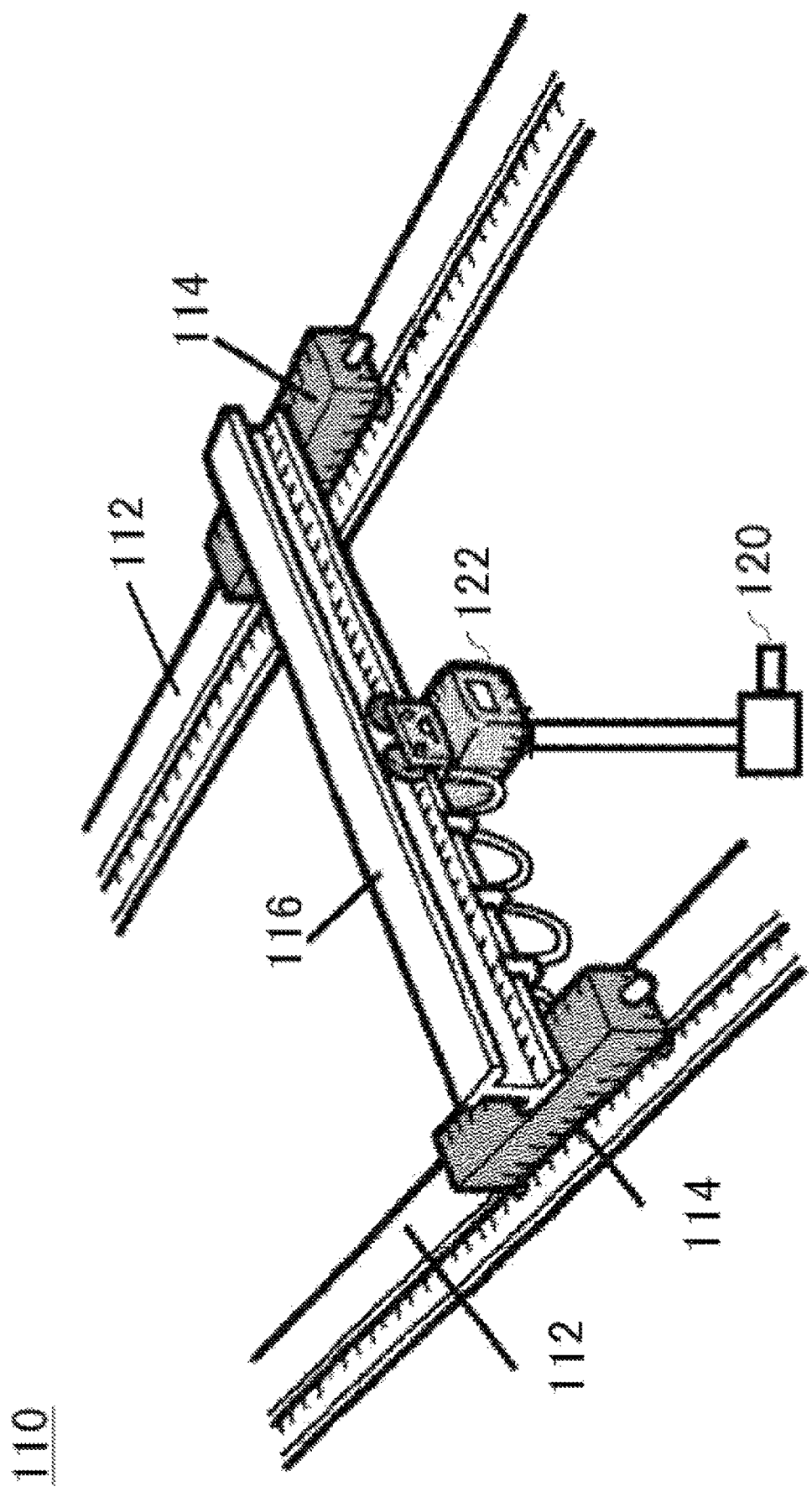
FIG. 3 schematically illustrates an example of a connector moving unit 110.

FIG. 3 schematically illustrates an example of the connector moving unit 110. The connector moving unit 110 includes traveling rails 112, saddles 114, a garter 116, and a connector support portion 122. When the saddles 114 run on the traveling rails 112 and the connector support portion 122 moves along the garter 116, the connector 120 is moved in the lateral direction. In addition, the connector support portion 122 moves the connector 120 in the vertical direction. The structure of the connector moving unit 110 illustrated in FIG. 2 is an example Other structures may be employed as long as the connector 120 is movable in the lateral direction and the vertical direction.

Figure 4:
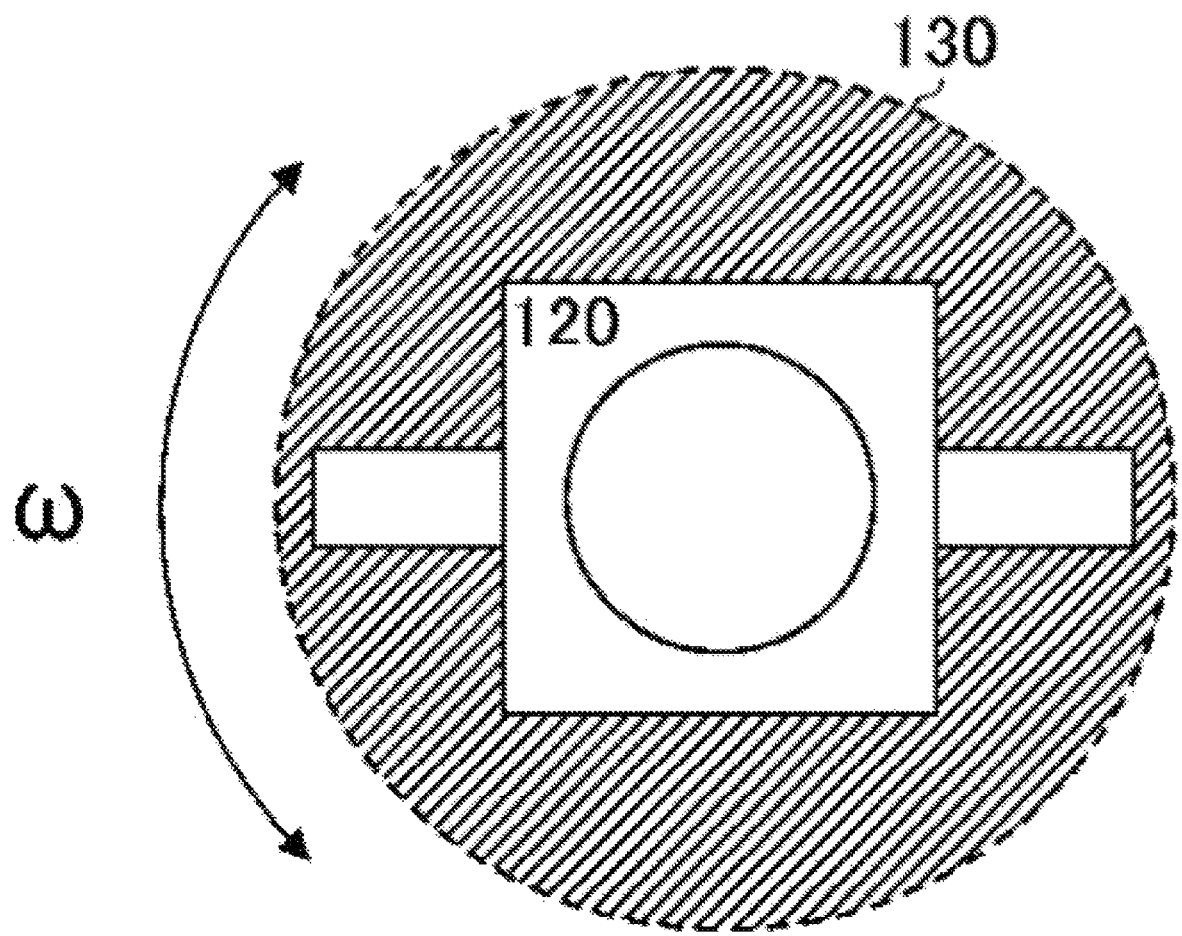
FIG. 4 schematically illustrates an example of a rotating area 130 of a connector 120.

FIG. 4 schematically illustrates an example of a rotating area 130 of the connector 120. The power receiving and feeding equipment control unit 200 may cause the connector moving unit 110 to rotate the connector 120. The power receiving and feeding equipment control unit 200 may cause the connector moving unit 110 to move the connector 120 in consideration of the rotating area 130 of the connector 120.

Figure 5:
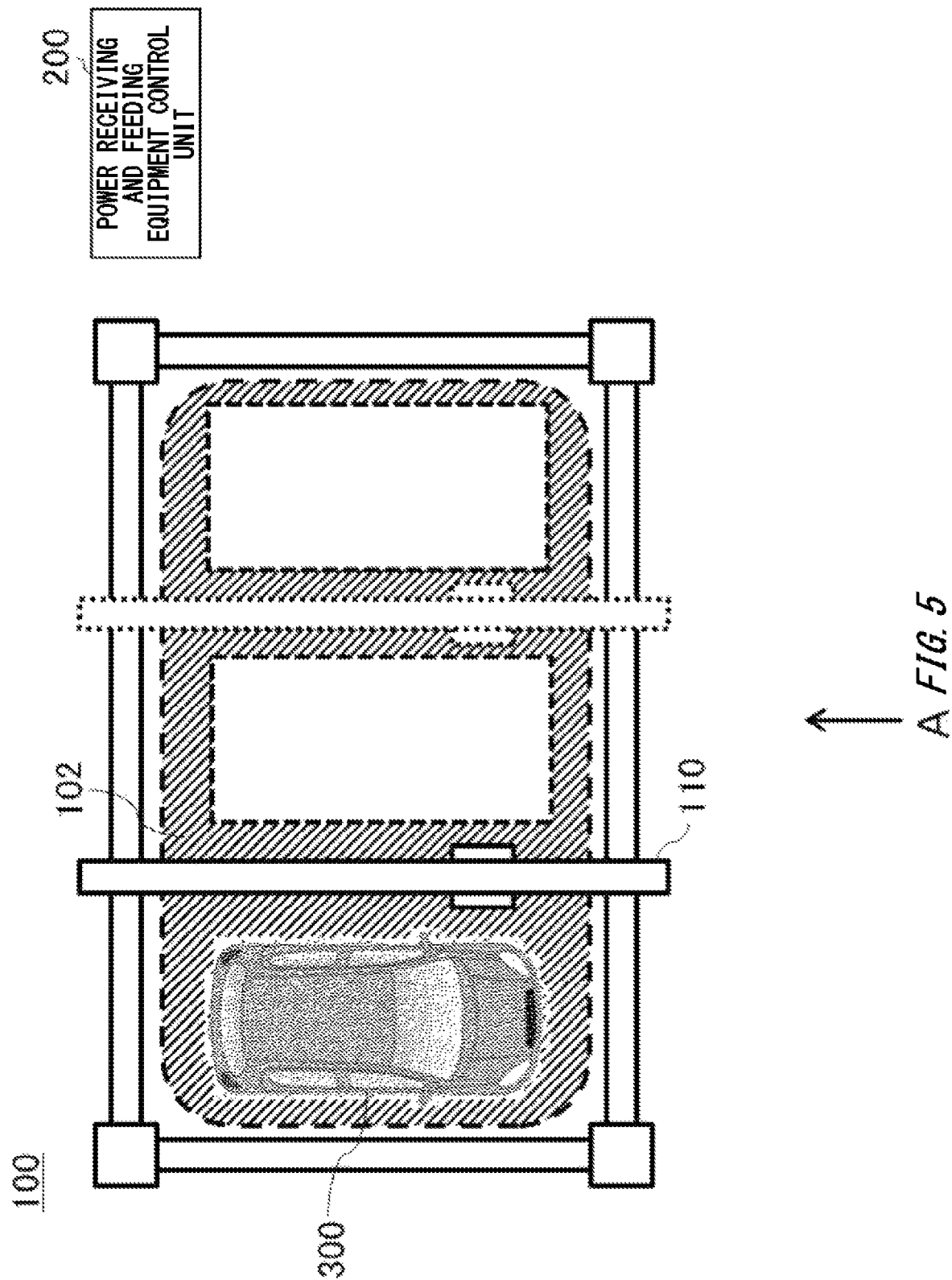
FIG. 5 schematically illustrates another example of the power receiving and feeding equipment 100.
Figure 6:
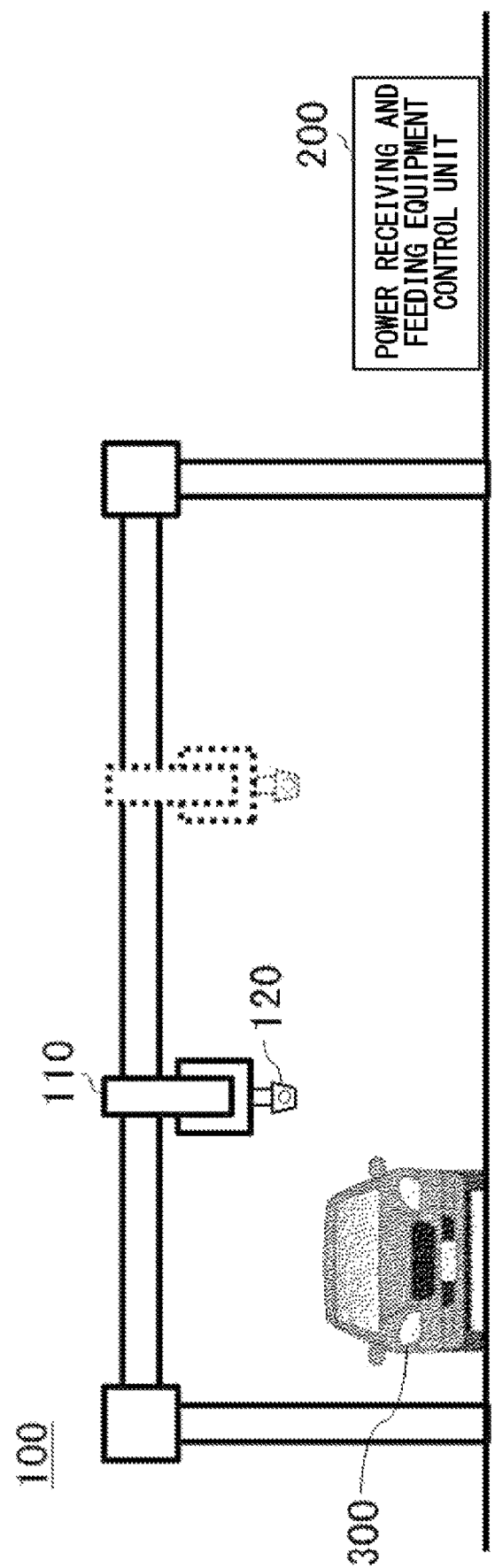
FIG. 6 schematically illustrates another example of the power receiving and feeding equipment 100.

FIGS. 5 and 6 schematically illustrate another example of the power receiving and feeding equipment 100. FIG. 5 is a diagram of the power receiving and feeding equipment 100 viewed from above, and FIG. 6 is a diagram of the power receiving and feeding equipment 100 viewed from the horizontal direction indicated by an arrow A as illustrated in FIG. 5. In FIGS. 1 and 2, the power receiving and feeding equipment 100 has been described as an example having a space for one vehicle, but the power receiving and feeding equipment 100 may have spaces for any number of vehicles. In FIGS. 5 and 6, the power receiving and feeding equipment 100 is illustrated to have spaces for three vehicles. The power receiving and feeding area is the range indicated by 102. In this case, two or more connector moving units 110 and two or more connectors 120 may be provided.

Figure 7:
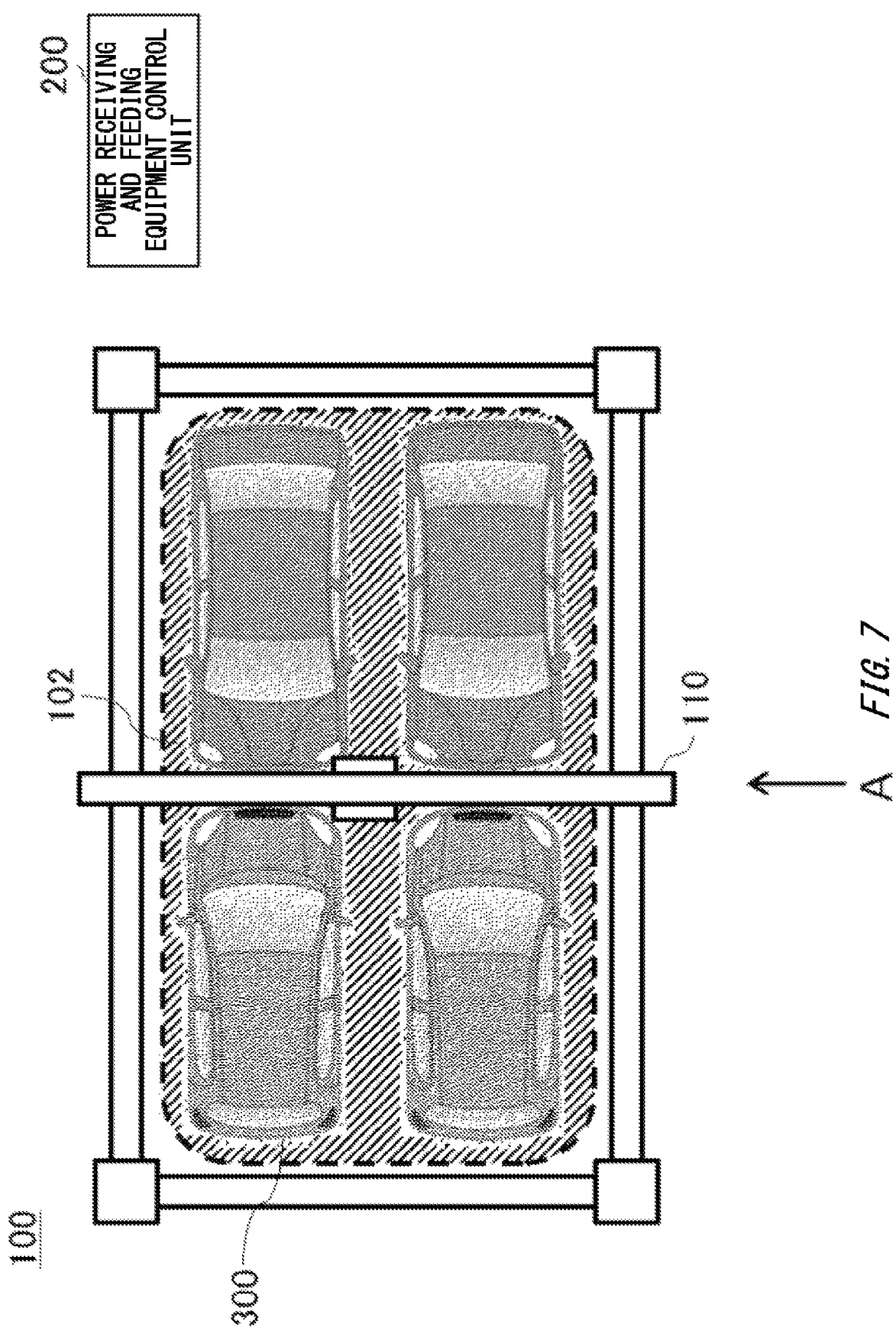
FIG. 7 schematically illustrates another example of the power receiving and feeding equipment 100.
Figure 8:
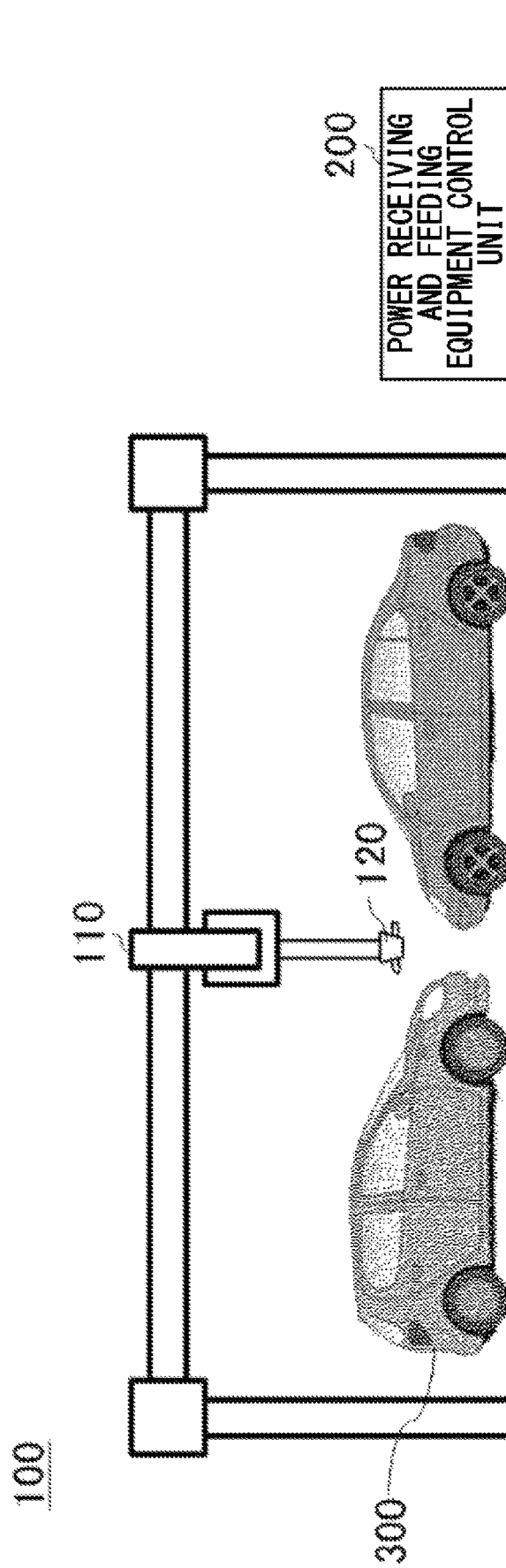
FIG. 8 schematically illustrates another example of the power receiving and feeding equipment 100.

FIGS. 7 and 8 schematically illustrate another example of the power receiving and feeding equipment 100. FIG. 7 is a diagram of the power receiving and feeding equipment 100 viewed from above, and FIG. 8 is a diagram of the power receiving and feeding equipment 100 viewed from the horizontal direction indicated by an arrow A as illustrated in FIG. 7. In FIGS. 7 and 8, the power receiving and feeding equipment 100 is illustrated to have spaces for four vehicles. The power receiving and feeding area is the range indicated by 102. In this case, two or more connector moving units 110 and two or more connectors 120 may be provided.

Figure 9:
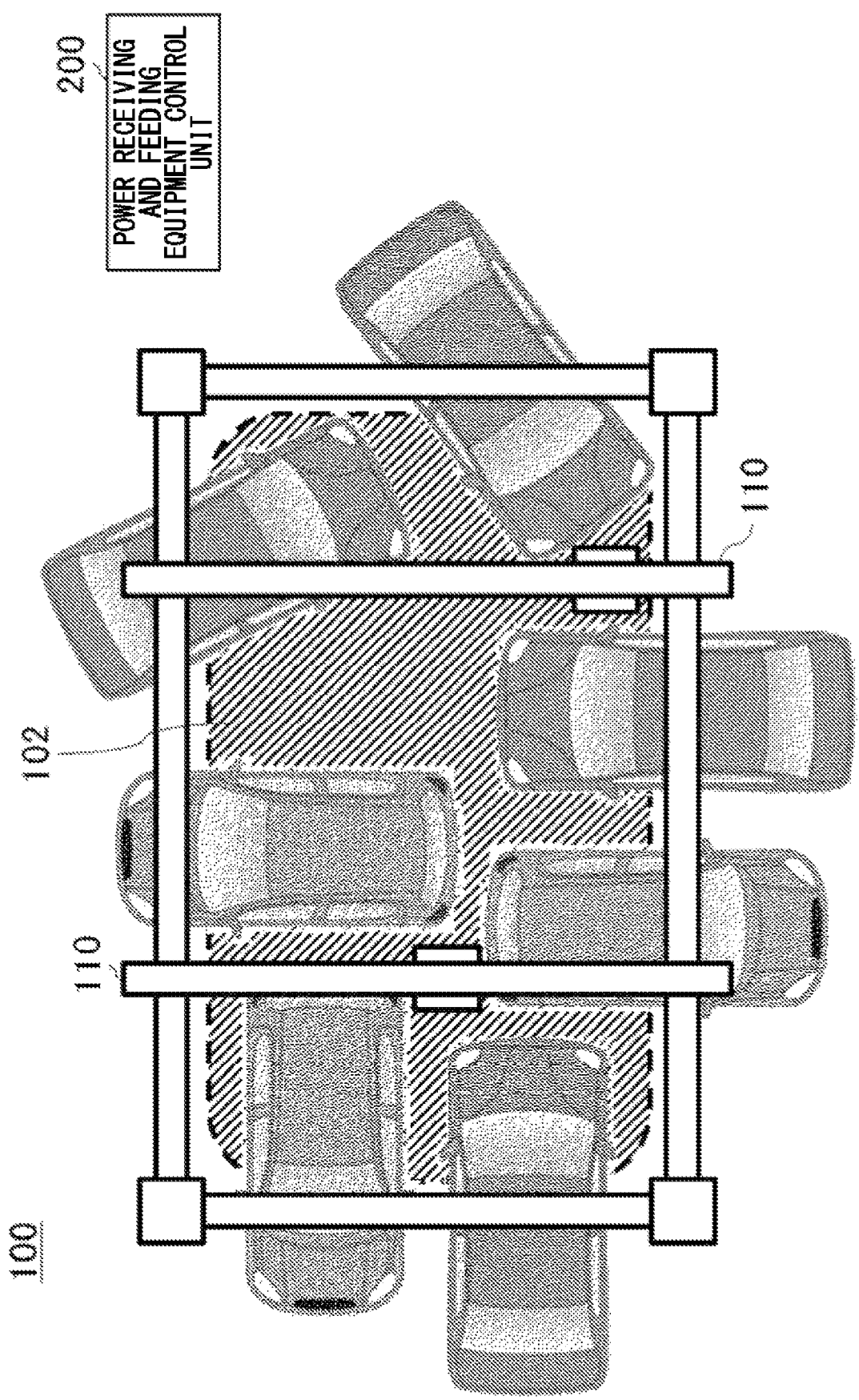
FIG. 9 schematically illustrates another example of the power receiving and feeding equipment 100.

FIG. 9 schematically illustrates another example of the power receiving and feeding equipment 100. As illustrated in FIG. 9, as long as the power receiving and feeding outlet is disposed in the power receiving and feeding area 102, a plurality of vehicles 300 may be disposed at any angle in the power receiving and feeding equipment 100. The power receiving and feeding area is the range indicated by 102. In this case, two or more connector moving units 110 and two or more connectors 120 may be provided. Parking vehicles with respect to the power receiving and feeding equipment in such a manner greatly improve the flexibility of parking of vehicles. Further, since the power receiving and feeding outlets of more vehicles can be disposed in the power receiving and feeding area 102, the control of the power receiving and feeding of more vehicles is possible, and the power receiving and feeding equipment 100 can be utilized with efficiency.

Figure 10:
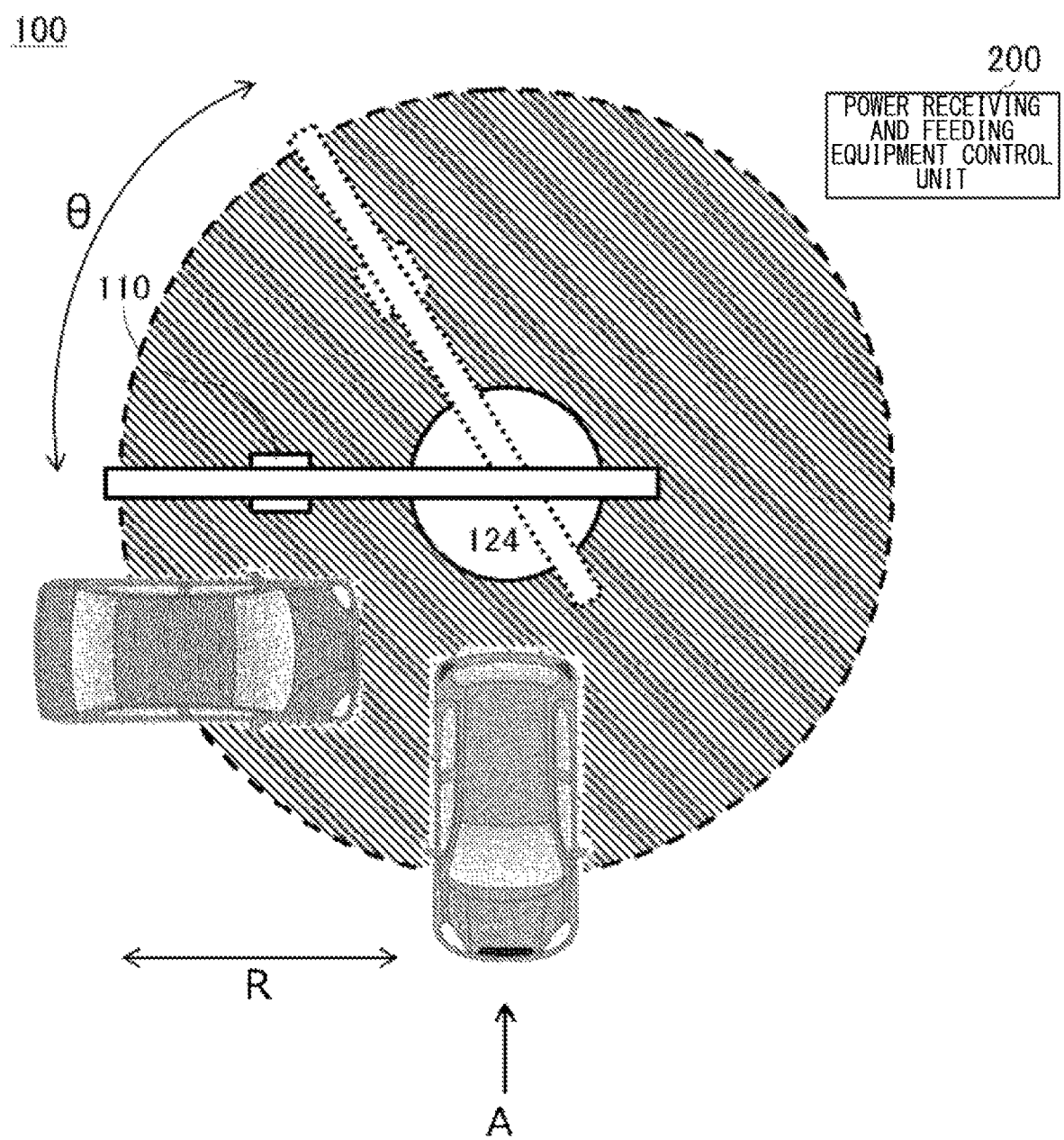
FIG. 10 schematically illustrates another example of the power receiving and feeding equipment 100.
Figure 11:
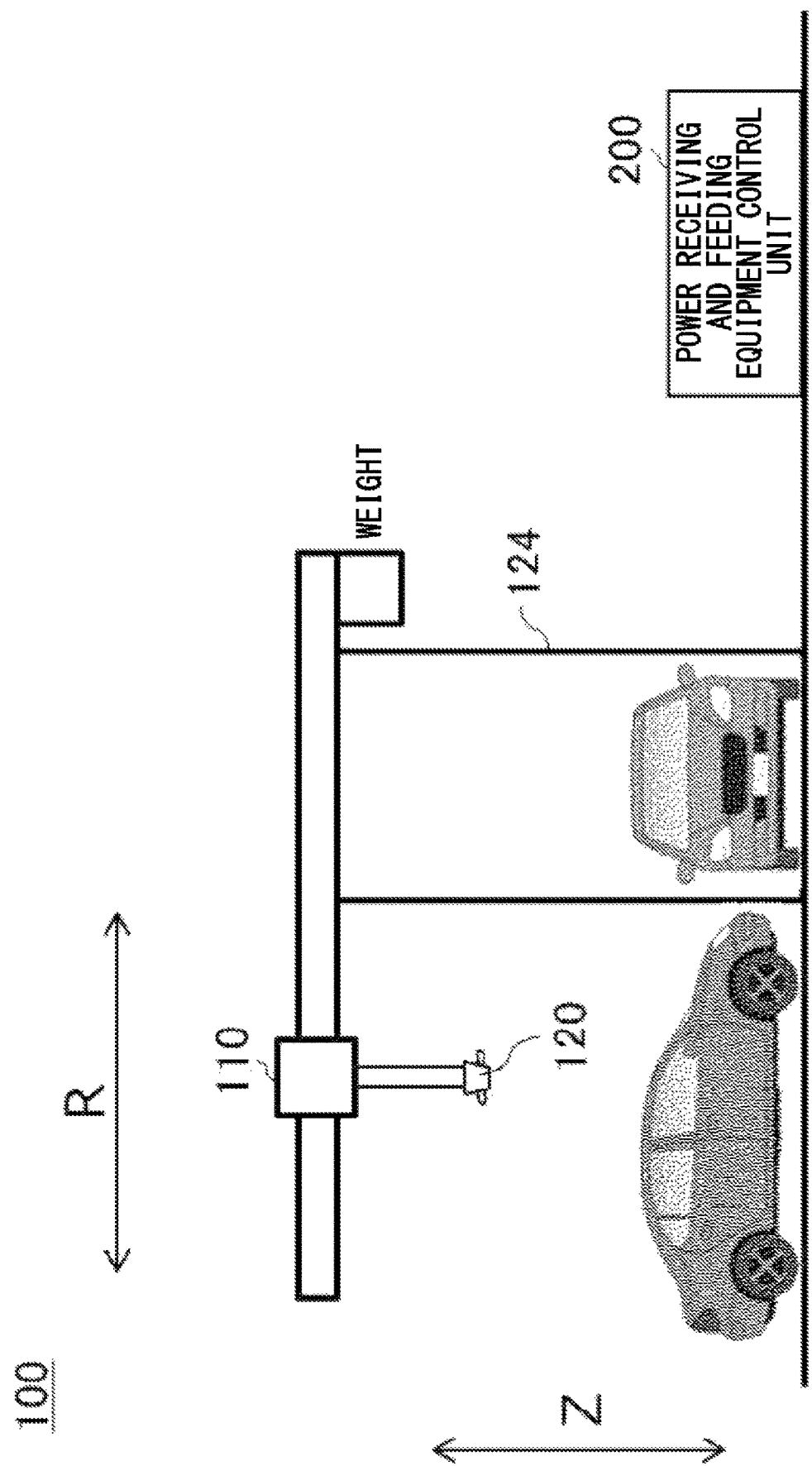
FIG. 11 schematically illustrates another example of the power receiving and feeding equipment 100.

FIGS. 10 and 11 schematically illustrate another example of the power receiving and feeding equipment 100. FIG. 10 is a diagram of the power receiving and feeding equipment 100 viewed from above, and FIG. 11 is a diagram of the power receiving and feeding equipment 100 viewed from the horizontal direction indicated by an arrow A as illustrated in FIG. 10. Although the above embodiment has been described by giving an example in which the connector 120 is moved in the lateral direction by the traveling rails 112, the saddles 114, and the garter 116, the invention is not limited thereto. The connector moving unit 110 may move the connector 120 in the lateral direction, for example, by rotational movement about a strut 124 as illustrated in FIGS. 10 and 11. In this case, the X coordinate and the Y coordinate defining the position in the horizontal direction illustrated in the above embodiment can be replaced with an R coordinate and a rotating angle θ, respectively. The power receiving and feeding area is the range indicated by 102. In this case, two or more connector moving units 110 and two or more connectors 120 may be provided. In such a power receiving and feeding equipment, the flexibility of parking of vehicles is greatly improved. Further, since the power receiving and feeding outlets of more vehicles can be disposed in the power receiving and feeding area 102, the control of the power receiving and feeding of more vehicles is possible, and the power receiving and feeding equipment 100 can be utilized with efficiency.

Figure 12:
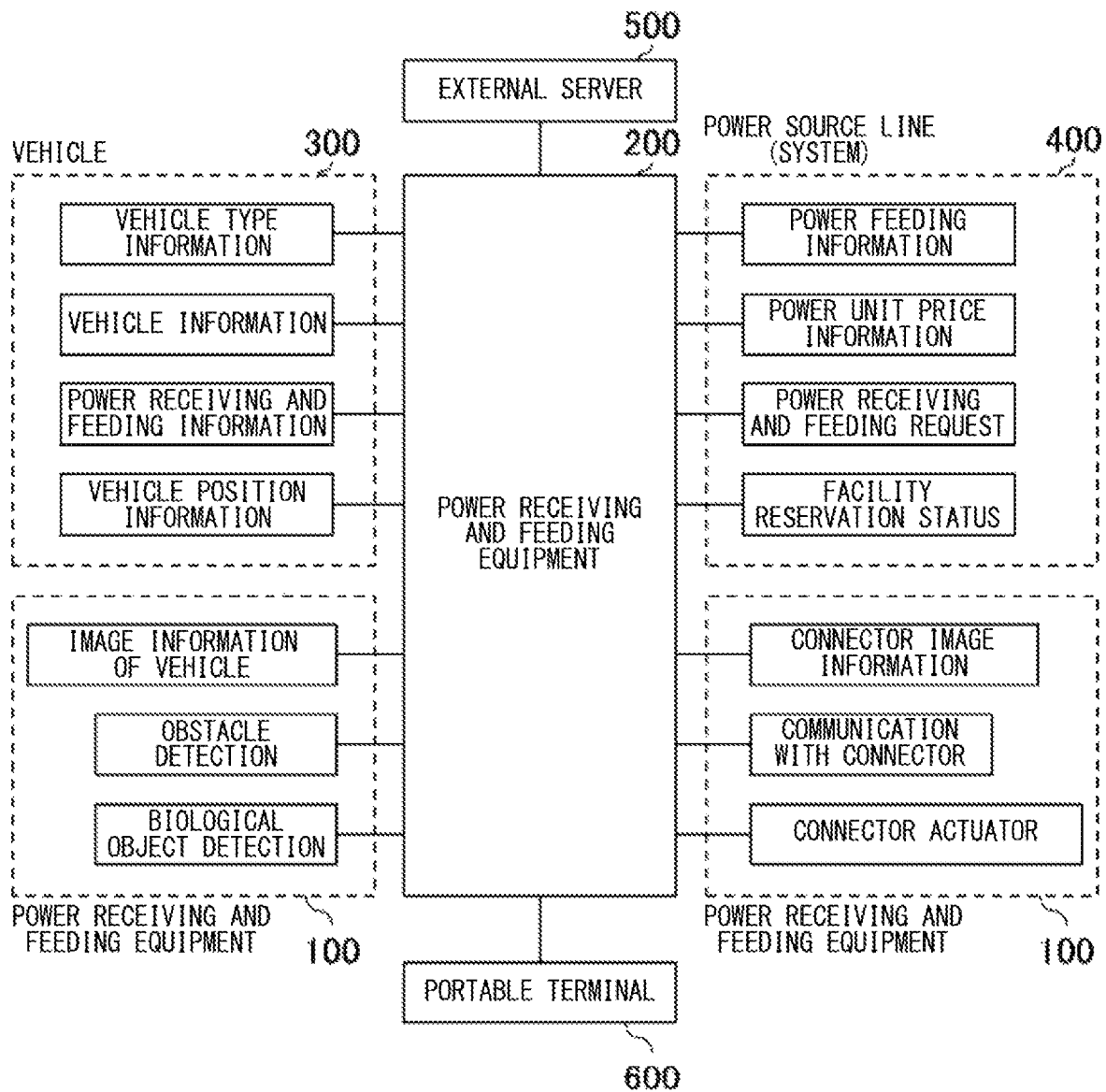
FIG. 12 schematically illustrates an example of a communication environment of a power receiving and feeding equipment control unit 200.

FIG. 12 schematically illustrates an example of the communication environment of the power receiving and feeding equipment control unit 200. The power receiving and feeding equipment control unit 200 may be able to communicate with the power receiving and feeding equipment 100, the vehicle 300, a power source line 400, an external server 500, and a portable terminal 600.

The power receiving and feeding equipment control unit 200 transmits and receives various types of information to and from the power receiving and feeding equipment 100. For example, the power receiving and feeding equipment control unit 200 receives image information of the vehicle 300 captured by an image capturing apparatus provided in the power receiving and feeding equipment 100, obstacle information indicating an obstacle existing around the vehicle 300 which is detected by the power receiving and feeding equipment 100, information of a biological object existing around the vehicle 300 which is detected by the power receiving and feeding equipment 100, connector image information captured by the image capturing apparatus of the connector 120, and the like from the power receiving and feeding equipment 100. In addition, the power receiving and feeding equipment control unit 200 communicates with a connector actuator which moves the connector 120 of the power receiving and feeding equipment 100.

The power receiving and feeding equipment control unit 200 transmits and receives various types of information to and from the vehicle 300. For example, the power receiving and feeding equipment control unit 200 receives vehicle type information indicating the type of the vehicle 300, vehicle information containing the dimension of the vehicle 300, the position of the power receiving and feeding outlet, and the like, power receiving and feeding information containing a power receiving and feeding request and the like, vehicle position information indicating the position of the vehicle 300, and the like.

The power receiving and feeding equipment control unit 200 transmits and receives various types of information to and from the power source line 400. For example, the power receiving and feeding equipment control unit 200 receives power feeding information containing information such as an amount of power feeding, power unit price information indicating a unit price of power, the power receiving and feeding request, a facility reservation status indicating a status of reservation of the power receiving and feeding equipment 100, and the like from the power source line 400.

The power receiving and feeding equipment control unit 200 transmits and receives various types of information to and from the external server 500. For example, if the power is supplied to the vehicle 300, the power receiving and feeding equipment control unit 200 communicates with the external server 500 information of power, information of charging, and the like to charge the owner of the vehicle 300 or the like.

The power receiving and feeding equipment control unit 200 transmits and receives various types of information to and from the portable terminal 600. The portable terminal 600 is, for example, a terminal used by the owner of the vehicle 300. The portable terminal 600 may be, for example, a portable phone such as a smart phone, a tablet terminal, or the like. The power receiving and feeding equipment control unit 200 transmits, for example, a status of charging of the vehicle 300 to the portable terminal 600. As a specific example, the power receiving and feeding equipment control unit 200 transmits information such as the degree of completion of charging a battery of the vehicle 300, the time to be taken for fully charging the vehicle 300 to the portable terminal 600.

Figure 13:
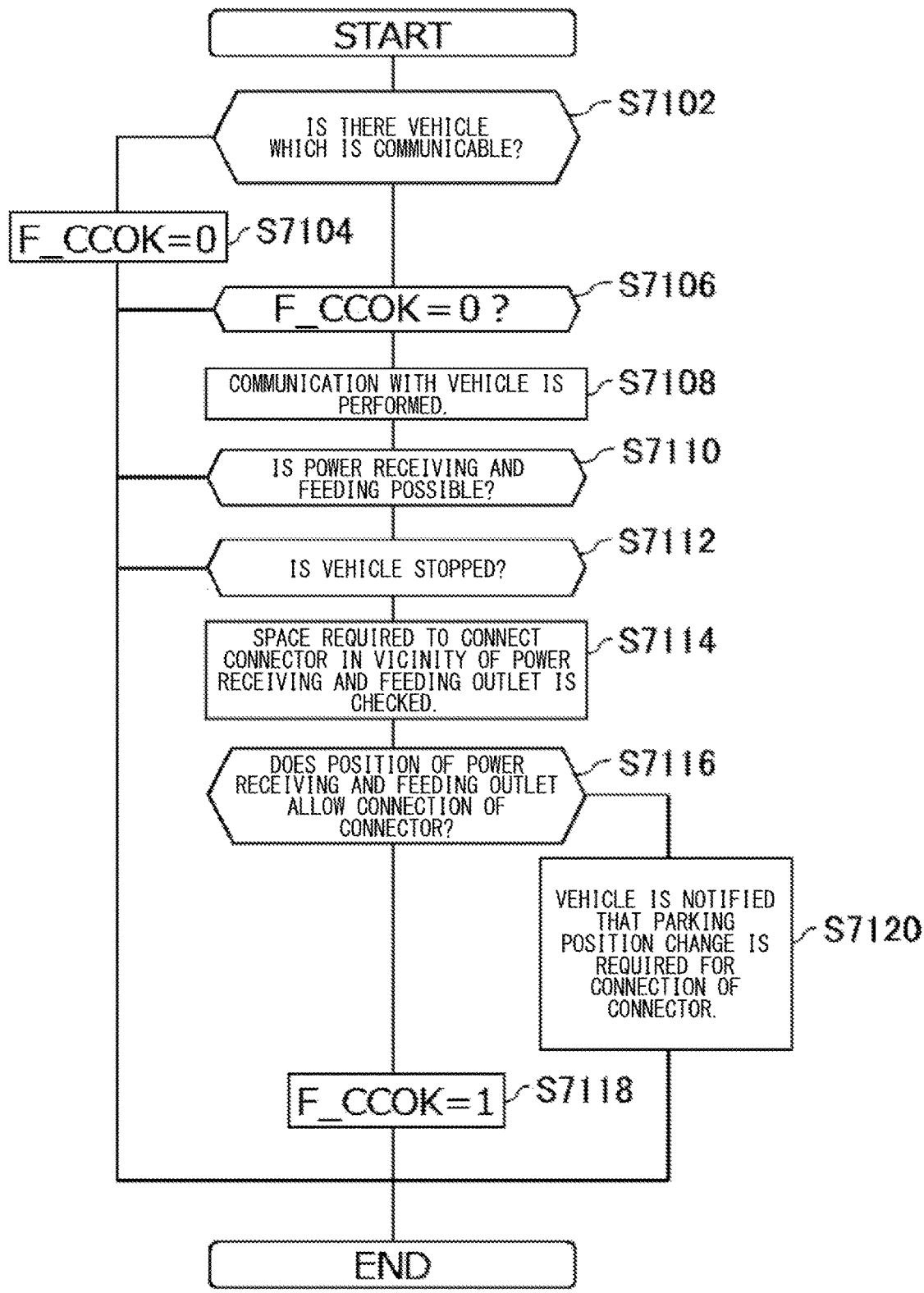
FIG. 13 schematically illustrates an example of a connection determination process 710 of the connector 120.

FIG. 13 schematically illustrates an example of a connection determination process 710 of the connector 120. The process illustrated in FIG. 13 may be mainly performed by a controller of the power receiving and feeding equipment control unit 200. Each process step may be performed at a period of 200 msec. Each process step may be performed at a period other than 200 msec, or may be performed in synchronization with another signal. Each decision in the flow is basically proceeds downwards when affirmative.

In Step (hereinafter, step may be abbreviated to S) 7102, it is determined whether there is a vehicle 300 which can communicate with the power receiving and feeding equipment 100. If there is the vehicle 300 capable of communicating so, the process proceeds to S7106. In a case where there is no vehicle 300 capable of communicating so, the process proceeds to S7104, and F_CCOK is set to 0 and the process ends. F_CCOK is a flag indicating whether the movement and connection of the connector 120 is possible, in which 1 corresponds to possible and 0 to impossible. In S7106, it is determined whether F_CCOK is 0. In a case where the result is denied, the process is already completed in the previous routine. Since the flag is set to 1 in S7118 described later, and the movement and connection of the connector 120 is possible (=1), the connection determination process 710 ends.

In S7108, the communication with the vehicle is performed. The information of the power receiving and feeding area 102 of the power receiving and feeding equipment 100, charging cost, waiting status, predicted charging time, probability of participation of power feeding to the power grid, the position information of the vehicle recognized from the power receiving and feeding equipment 100 side, and the like are transmitted from the power receiving and feeding equipment control unit 200 to the vehicle. For example, the power receiving and feeding equipment control unit 200 may identify the position of the vehicle by referring to the image captured by the image capturing apparatus which monitors the space for parking the vehicle. The information (vehicle type, power receiving and feeding request, determination of parking (stop) intention, the position information, etc.) from the vehicle, the image information containing the image of the captured vehicle, and the like are transmitted from the vehicle to the power receiving and feeding equipment control unit 200.

In S7110, the probability of power receiving and feeding is determined from the probability of parking the vehicle into the power receiving and feeding area 102. In this case, it does not necessarily require an indication of the intention of power receiving and feeding from the vehicle side. In the case of no probability of power receiving and feeding, the connection determination process 710 ends. In S7112, it is determined whether the vehicle is in a stopped state. This is because the movement and connection of the connector 120 cannot be started if the vehicle is not in the stopped state. In a case where the vehicle is not in the stopped state, the connection determination process 710 ends.

In S7114, it is checked whether a space required to connect the connector to the vicinity of the power receiving and feeding outlet of the stopped vehicle is secured. At this time, a positional relationship between the rotating area 130 and other parked vehicles or the like may be considered. For example, in a case where there is caused an influence on getting in and out other vehicles even though the connector 120 is possible to rotate, it may be further determined including consideration for parking of other vehicles which may park later and the like.

In S7116, it is determined whether the position of the power receiving and feeding outlet allows the connection of the connector. In the case of the state where the connection of the connector is possible, the process proceeds to S7118. In the case of the state where the connection of the connector is not possible, the process proceeds to S7120. In S7118, F_CCOK is set to 1. F_CCOK may be reset to 0 according to parking situations of other vehicles and the like after the vehicle has parked. For example, there is a case where the following vehicle is parked to obstruct the power receiving and feeding outlet of the own vehicle.

In S7120, the vehicle is notified that a parking position change is required for the connection to the power receiving and feeding equipment. The power receiving and feeding equipment control unit 200 transmits, for example, data indicating that the parking position change is required to the vehicle. The power receiving and feeding equipment control unit 200 may also notify the vehicle of the position information which indicates the position where the connection of the connector 120 is possible. It is notified that the movement and connection of the connector 120 is not possible to start at the current parking position to the vehicle 300. If there is an intention of power receiving and feeding, the change of the parking position may be prompted. In addition, the change of the parking position may be instructed to an automatic driving device if the vehicle includes the automatic driving device capable of automatically changing the parking position.

In a case where parking is completed in the state of F_CCOK=0, the connection of the connector 120 is left impossible in the automatic mode. Therefore, the subsequent control is not performed. In a case where parking is completed in the state of F_CCOK=1, the subsequent control including the automatic connection of the connector 120 is performed in response to the power receiving and feeding request.

Figure 14:
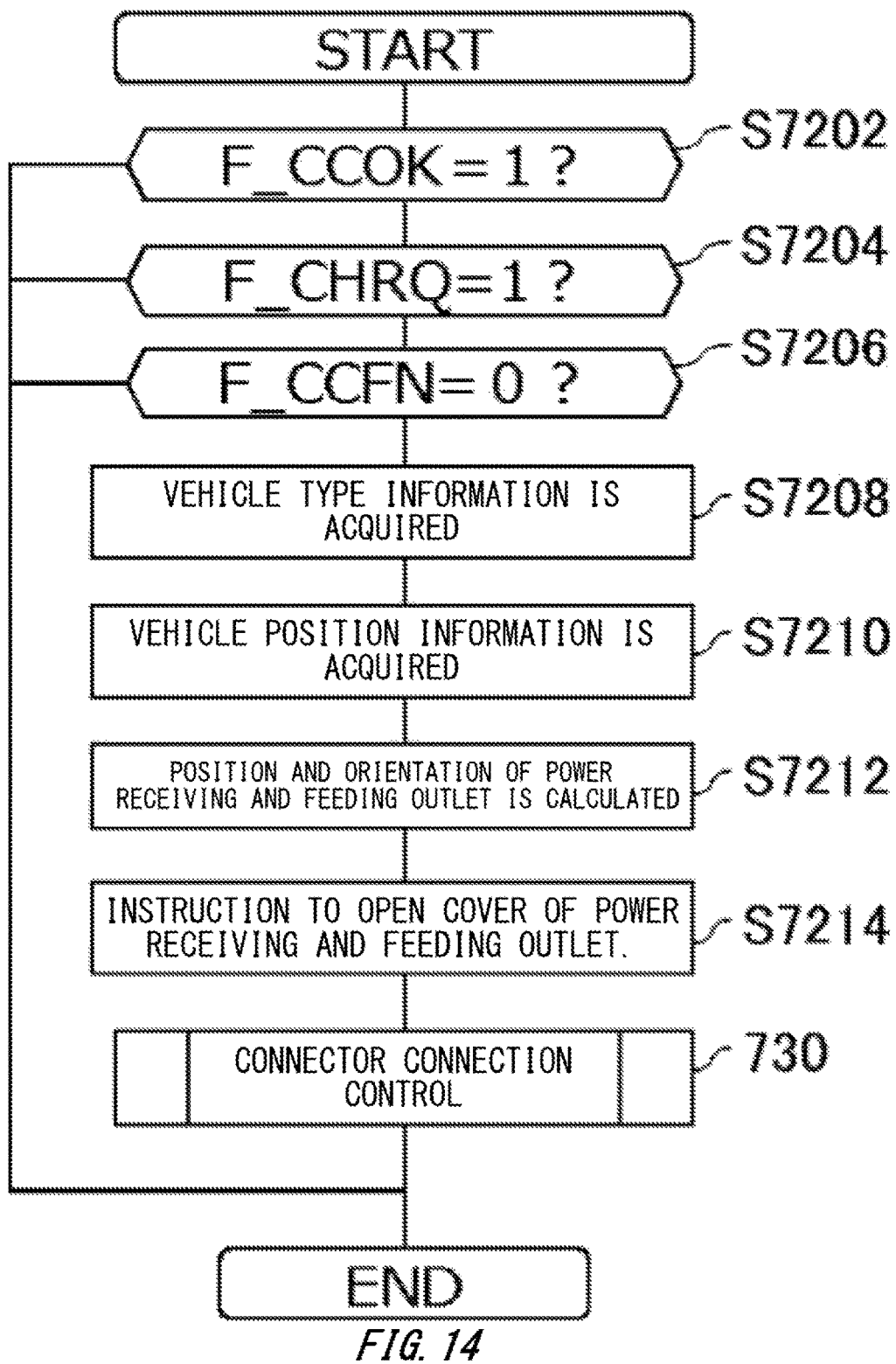
FIG. 14 schematically illustrates an example of a connection control process 720 of the connector 120.

FIG. 14 schematically illustrates an example of a connection control process 720 of the connector 120. The process illustrated in FIG. 14 may be mainly performed by the controller of the power receiving and feeding equipment control unit 200.

In S7202, it is determined whether F_CCOK is 1. In the case of denial, the connection control process 720 of the connector 120 ends. In the case of affirmative, the process proceeds to S7204. In S7204, it is determined whether F_CHRQ is 1. F_CHRQ is a flag for determining whether there is a power receiving and feeding request, and is set in a process (not illustrated). The flag "0" indicates "no request", and "1" indicates "requested". F_CHRQ is usually a charging request. These flags may be set by a request from the vehicle, a request which is input to the vehicle from a vehicle administrator, or the like, and determined by indexes such as a charging amount, a charging end time, and a charging cost. In addition, it is also conceivable a schedule change such as a case where a situation of waiting in line in a crowded condition or the like of the power receiving and feeding equipment 100 is changed. Further, F_CHRQ may be set from the portable terminal 600 or the like with which the vehicle administrator or the like communicates with the vehicle or the power receiving and feeding equipment 100. It is possible to instruct the charging by operating the portable terminal 600 even in a case where there is no charging schedule. F_CHRQ is set according to the determination of the vehicle administrator like the charging request even in a case where there is a request of V2G for exchanging power and the power source line 400. In a case where it is determined that F_CHRQ is zero (0), it can be determined that there is no power receiving and feeding request. Therefore, the connection control process 720 of the connector 120 ends.

In S7206, it is determined whether F_CCFN is zero (0). F_CCFN is a flag for determining whether the connector 120 is connected to a target vehicle. "0" indicates an unconnected state, and "1" indicates a connected state. In a case where F_CCFN=0 is denied, F_CCFN is 1 indicating that the connector 120 is already connected to the target vehicle. Therefore, the connection control process 720 of the connector 120 ends. In a case where F_CCFN=0 is affirmed, the process proceeds next to S7208.

In S7208, the vehicle type information is acquired, and the connector type, the connector connection position, and the like are identified from the vehicle type information. In S7210, the vehicle position information is acquired. The vehicle position information includes a parking state and an orientation of the vehicle, a presence and absence of the obstacle, and the like. Then, the power receiving and feeding equipment control unit 200 calculates the position and the orientation of the power receiving and feeding outlet. In S7212, a lid opening instruction is transmitted, to the vehicle, to open the lid portion that covers the power receiving and feeding outlet. In a case where the vehicle is a vehicle of the type in which the lid portion of the power receiving and feeding outlet is manually opened, the power receiving and feeding equipment control unit 200 may determine, by the image or communication information, whether the lid portion is opened. Then, the process proceeds to the connector connection control of 5730.

Figure 15:
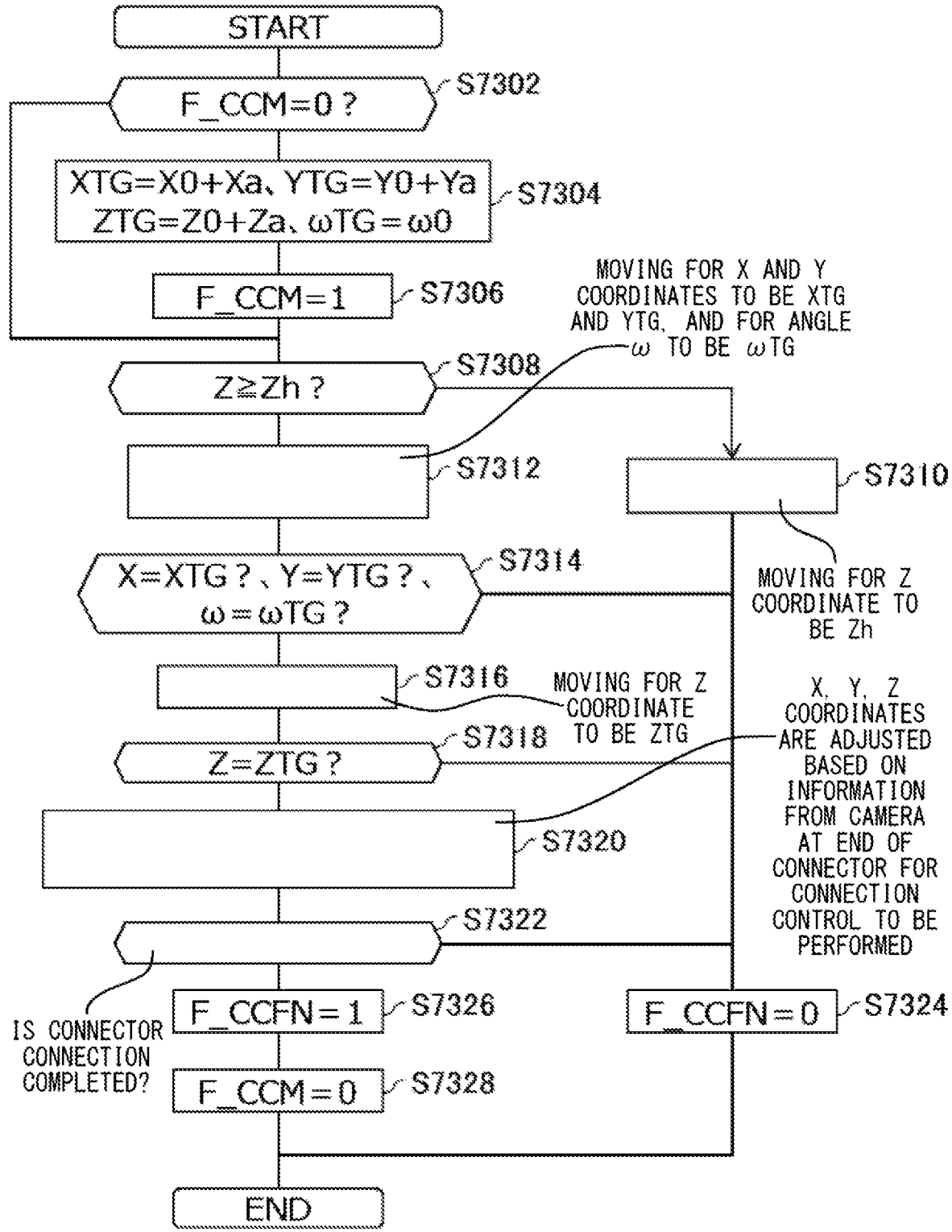
FIG. 15 schematically illustrates an example of a connection control process 730 of the connector 120.

FIG. 15 schematically illustrates an example of a connection control process 730 of the connector 120. The process illustrated in FIG. 11 may be mainly performed by the controller of the power receiving and feeding equipment control unit 200.

In S7302, it is determined whether F_CCM is zero (0). F_CCM is a flag for determining whether the connector 120 is under the connection control. "1" indicates that the connector under in the connection control, and "0" indicates that the connector is not under the connection control. In a case where the connection control process 730 is performed for the first time, the flag is set to "0". Thus, the process proceeds to S7304 to acquire a target coordinate of the connector 120. Further, X, Y, and Z correspond to the coordinates illustrated in FIGS. 1 and 2. XTG is a target value of the coordinate to which the connector 120 moves, X0 is a coordinate of the calculated position of the power receiving and feeding outlet, and Xa is a modified value of the target value which is obtained from the vehicle position and the orientation to move the connector before connection. YTG is a target value of the coordinate to which the connector 120 moves, Y0 is a coordinate of the calculated position of the power receiving and feeding outlet, and Ya is a modified value of the target value which is obtained from the vehicle position and the orientation to move the connector before connection. ZTG is a target value of the coordinate to which the connector 120 moves, Z0 is a coordinate of the calculated position of the power receiving and feeding outlet, and Za is a modified value of the target value which is obtained from the vehicle position and the orientation to move the connector before connection.

The reason for modification at Xa and Ya is to move the connector to the position where the connection control starts in consideration of the size of the single connector 120. $\omega$ indicates a rotating angle at which the connector faces the power receiving and feeding outlet. $\omega$ corresponds to the rotating angle illustrated in FIG. 3. $\omega$TG is a target value of the rotating angle of the connector, and $\omega$0 is a calculated rotating angle of the connector. In S7306, a target value of each coordinate is determined and the connector 120 is in a state of connection control. Thus, F_CCM is set to 1.

In S7308, it is determined whether the current Z coordinate is equal to or more than a predetermined height Zh. In the case of NO, the Z coordinate is controlled to be Zh in S7310, and the process proceeds to S7324. In S7324, F_CCFN, which is a flag for determining whether the connector 120 is connected to a target vehicle, is set to "0" corresponding to the unconnected state, and the routine ends. Zh is desirable to be a value higher than the height of the vehicle 300 to which the connector connection is performed, and may be set according to the acquired vehicle type information or the like. In addition, Zh may be set to a fixed value equal to or more (for example, Zh=2.5 m) than a predetermined height in consideration of an obstacle or the like which may exist in the vicinity of the power receiving and feeding equipment. In the case of Z$\geq$Zh, the process proceeds to S7312, and the control is performed toward the X and Y coordinates XTG and YTG. In addition, the connector 120 is rotated toward $\omega$TG to make the connector face the power receiving and feeding outlet. Moving the Z coordinate to be equal to or more than Zh before these processes is to prevent interference between the vehicle and other obstacles when the X and Y coordinates of the connector 120 are moved or rotated. Further, rotating toward $\omega$TG is not performed in S7312, but may be performed in conjunction with the process of S7320 to be described later.

In S7314, it is determined whether the X and Y coordinates of the connector 120 have been XTG and YTG respectively, and whether the rotating angle of the connector 120 has become $\omega$TG. In the case of denial, the process proceeds to S7324, and the process continues until each value reaches a target value by repeating the connection control process 730 of the connector 120. If it is determined that each value reaches the target value, the process proceeds to S7316, and the Z axis is controlled to the target value. In this case, the connector 120 is always controlled to descend from above the vehicle toward the power receiving and feeding outlet. During descent of the connector 120, it is detected whether there is an obstacle using a camera, a sensor, or the like provided in the connector 120. In a case where there is a concern of contact, the descent is stopped. In addition, even in a case where contact with an obstacle is detected, the descent is similarly stopped. In addition, the moving in the Z direction may continue while appropriately adjusting the X direction, the Y direction, and the rotating angle $\omega$ to avoid the contact.

In S7318, it is determined whether the coordinate of the Z axis is controlled to ZTG. In the case of denial, the process proceeds to S7324, and the process continues until the coordinate of the Z axis reaches a target value by repeating the connection control process 730 of the connector 120. In the case of affirmative, all of X, Y, $\omega$, and Z are controlled to the target value. Therefore, the process proceeds to S7320 to finally connect to the power receiving and feeding outlet. The control is performed by controlling an actuator based on information such as a camera, a radar, or the like provided at the end of the connector. Further, a plurality of connectors may be provided according to the vehicle type to be charged. In S7322, it is determined whether the connector connection is completed. In the case of denial, the process proceeds to S7324. On the other hand, in the case of affirmative in S7322, the connector connection is completed. Thus, the flag F_CCFN for determining whether the connector 120 is connected to a target vehicle is set to 1 in S7326. Thereafter, in S7328, the flag F_CCM for determining whether the connector 120 is in the connection control is set to 0.

Further, in a case where the power receiving and feeding equipment is controlled as illustrated in FIGS. 10 and 11, the same control as the flow illustrated in FIG. 15 can be performed by replacing the X and Y coordinates with the R coordinate and the rotating angle $\theta$ respectively.

Figure 16:
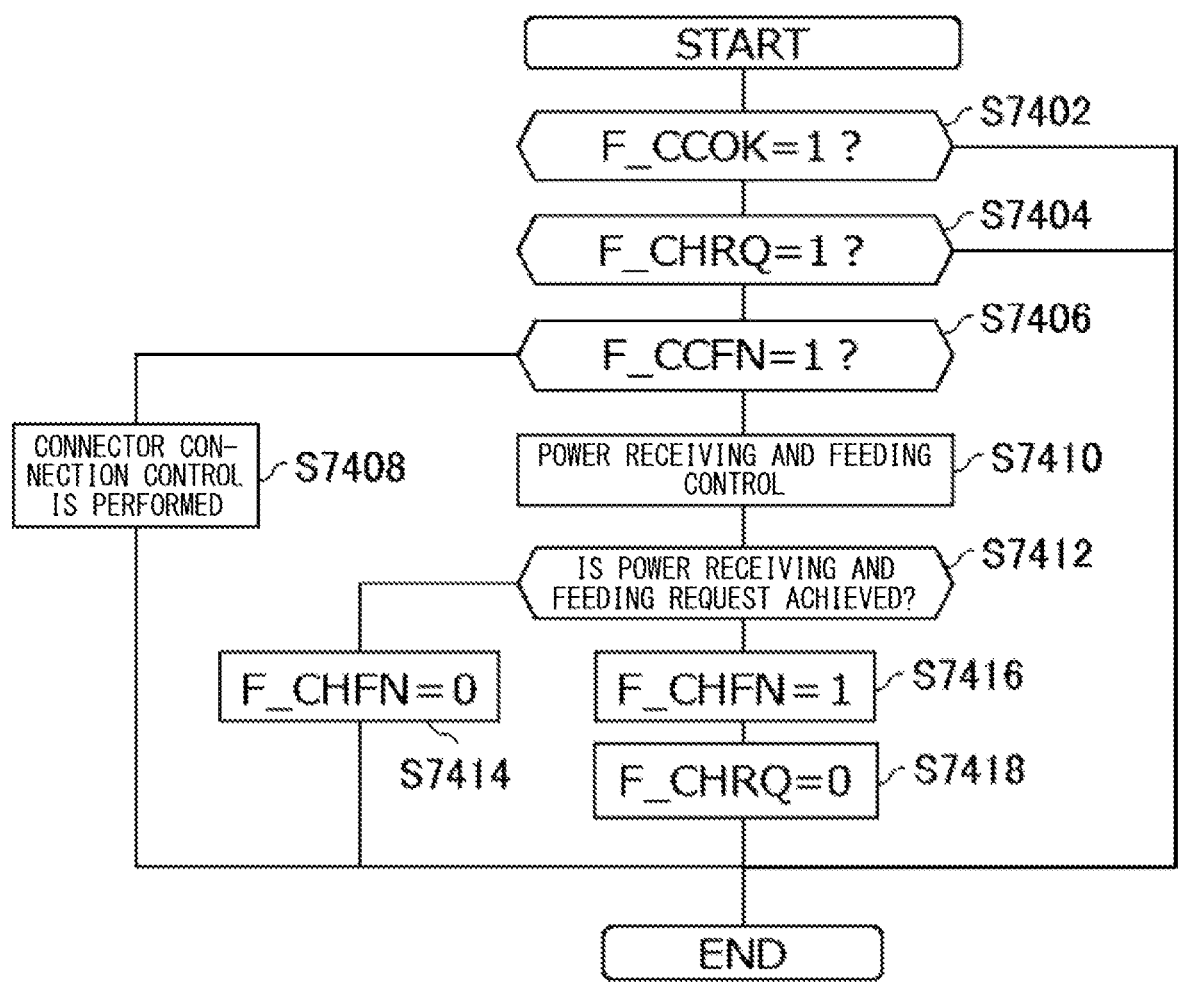
FIG. 16 schematically illustrates an example of a power receiving and feeding control process 740.

FIG. 16 schematically illustrates an example of a power receiving and feeding control process 740. The process illustrated in FIG. 16 may be mainly performed by the controller of the power receiving and feeding equipment control unit 200.

In S7402, it is determined whether F_CCOK is 1. In the case of denial, the vehicle is in a state where the communication with the power receiving and feeding equipment 100 is not performed. Therefore, the process of the power receiving and feeding control process 740 ends. In the case of affirmative, the process proceeds to S7404 to check the value of the flag F_CHRQ indicating whether there is a power receiving and feeding request. In the case of denial, it can be determined that there is no power receiving and feeding request. Therefore, the process of the power receiving and feeding control process 740 ends. In the case of affirmative, it is determined that there is a power receiving and feeding request, and the process proceeds to S7406 to determine whether the connector is connected to a target vehicle by "F_CCFN=1?". In the case of denial, the connector is not connected to a target vehicle. Therefore, the process proceeds to S7408 to perform the connector connection control. In the case of affirmative, it is determined that power receiving and feeding is possible, and the process proceeds to S7410 to perform the power receiving and feeding control. The control content of the power receiving and feeding may be set in process of determining F_CHRQ=1. Predetermined values of a charging power amount or a battery capacity, a power receiving and feeding control necessity by V2G, a control time, and the like may be set.

In S7412, it is determined whether the current request content is achieved. If the power receiving and feeding request is not satisfied, the process proceeds to S7414 to set "0" indicating the power receiving and feeding end to F_CHFN which is a flag indicating the power receiving and feeding end. In a case where, upon a determination that the current request content is achieved, the power receiving and feeding ends, the process proceeds to S7416 to set F_CHFN to 1. Thereafter, the process proceeds to S7418. Since the power receiving and feeding request at this time is achieved, F_CHRQ is reset to 0.

Figure 17:
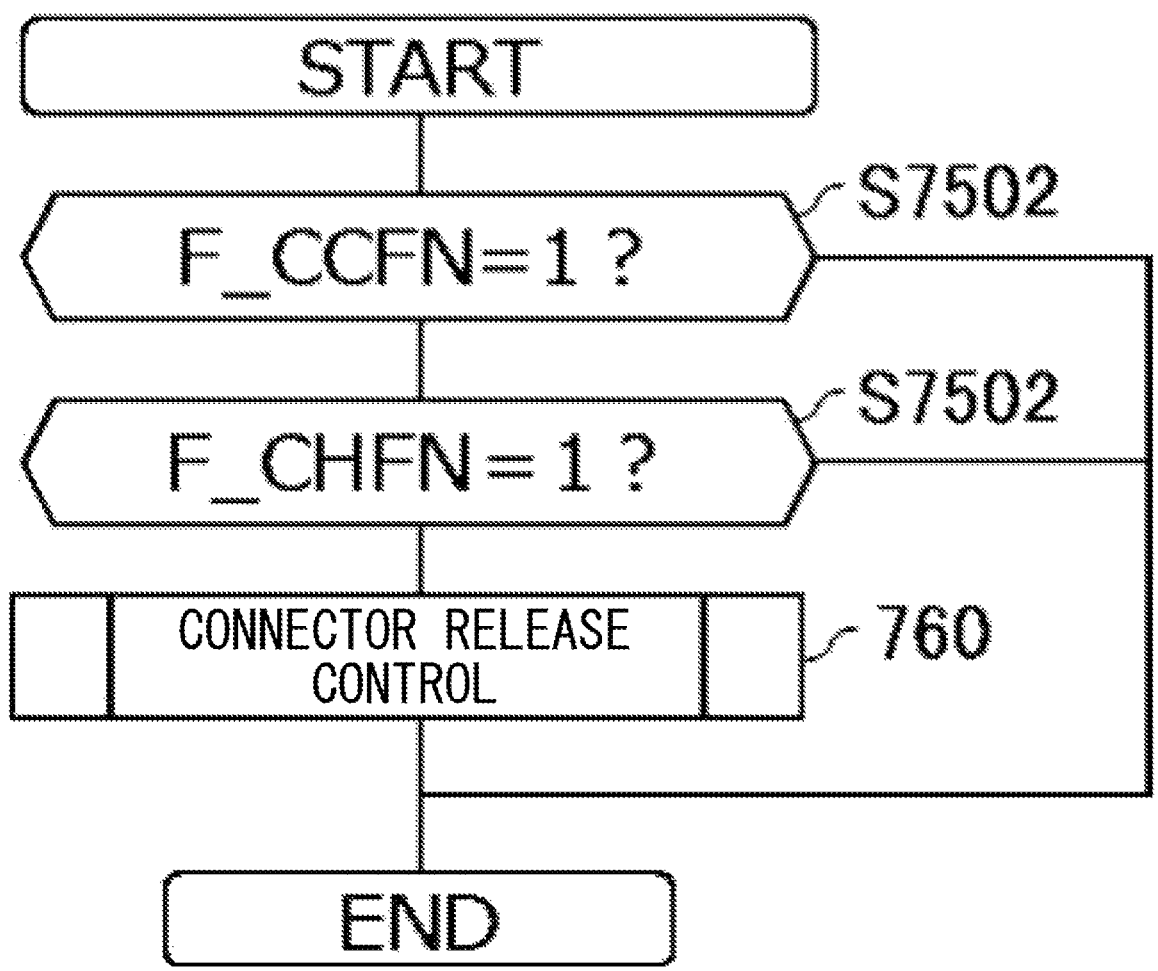
FIG. 17 schematically illustrates an example of a connector release control process 750.

FIG. 17 schematically illustrates an example of a connector release control process 750. The process illustrated in FIG. 15 may be mainly performed by the controller of the power receiving and feeding equipment control unit 200.

In S7502, it is determined whether F_CCFN is 1. If F_CCFN is zero (0), the connector 120 is disconnected and thus the process ends. In the case of affirmative, the process proceeds to S7504 to determine whether F_CHFN is 1. The power receiving and feeding end is determined by F_CHFN. In the case of denial, it is determined that the control of the power receiving and feeding continues, and the connector release control process 750 ends. On the other hand, in the case of affirmative, it is determined that the power receiving and feeding ends, a connector release control process 760 is performed.

Figure 18:
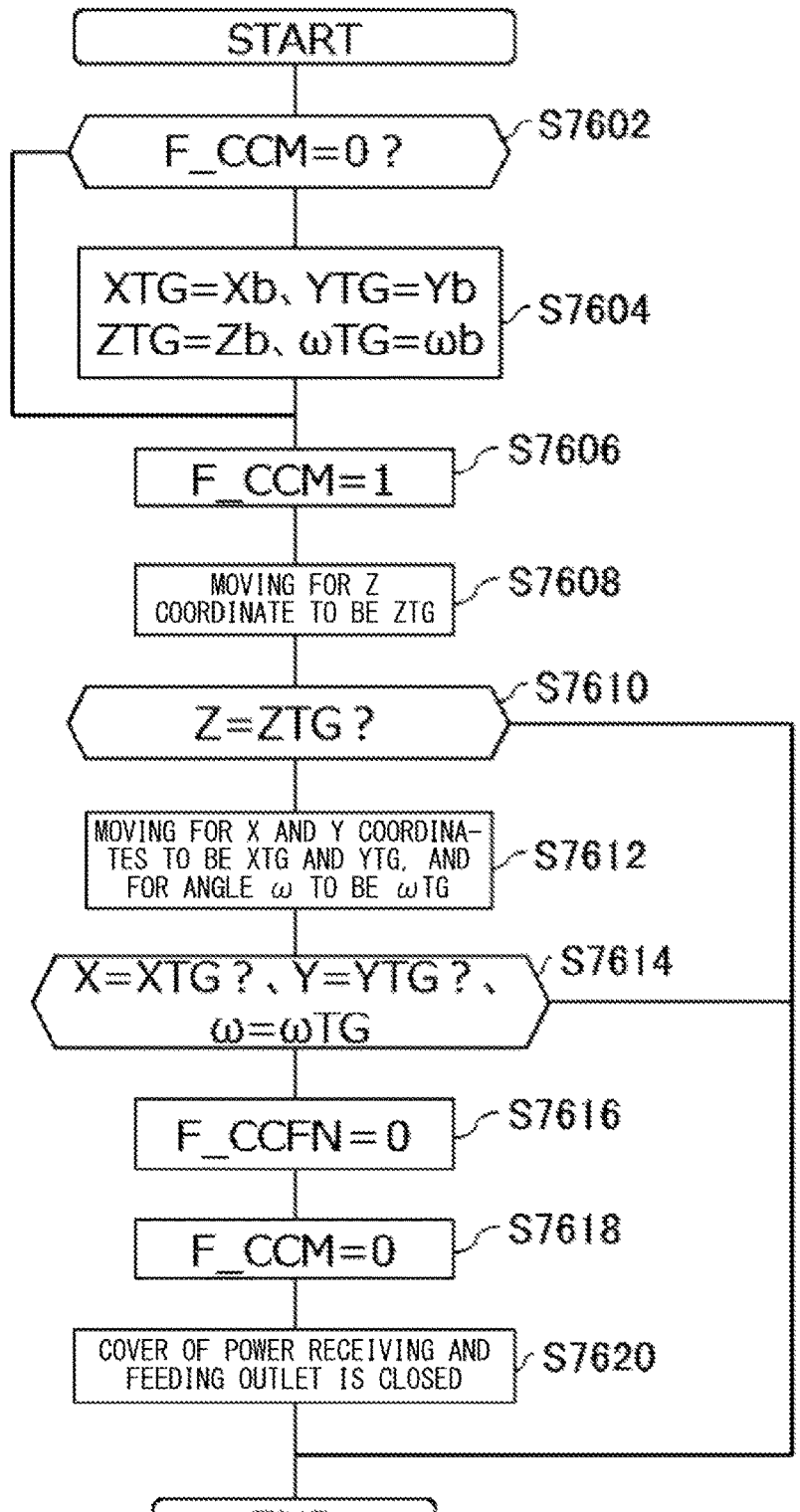
FIG. 18 schematically illustrates an example of a connector release control process 760.

FIG. 18 schematically illustrates an example of the connector release control process 760. The process illustrated in FIG. 18 may be mainly performed by the controller of the power receiving and feeding equipment control unit 200.

In S7602, it is determined whether F_CCM is zero (0). F_CCM is a flag for determining whether the connector 120 is under a movement control. "1" indicates that the connector under in the movement control, and "0" indicates that the connector is not under the movement control. In the case of denial, the process proceeds to S7606. On the other hand, in the case of affirmative, the process proceeds to S7604 to set the target coordinate at the time of releasing the connector 120. XTG and YTG each are the target values of the X and Y coordinates to move the connector. Xb and Yb are the coordinates to store the connector. ZTG is the target value of the Z coordinate, and Zb is the Z coordinate to store the connector. Zb is desirable the same or higher position as Zh of the previous, and Zh may be set to a maximum movable value in the Z coordinates. Xb and Yb may be predetermined positions such as the end of each coordinate, the central portion of the power receiving and feeding equipment 100, or the like, but may be set by learning the coordinate near the vicinity where the power receiving and feeding outlet is frequently placed. In addition, a target value ωTG of the rotating angle of the connector 120 is also set to a predetermined angle cob.

If XTG, YTG, ZTG, and ωTG are all set, the process proceeds to S7606. In S7606, a target value of each coordinate is determined and the connector 120 is in a state of connection control. Thus, F_CCM is set to 1. In S7608, the connector 120 is moved for the Z coordinate in the height direction to be ZTG initially. In S7610, it is determined whether Z is ZTG. In the case of denial, the process continues until the value of Z reaches ZTG by repeating the connection control process of the connector 120. On the other hand, in the case where Z=ZTG is affirmative, the connector 120 has reached the target height. Therefore, the process proceeds to S7612. In S7612, the control is performed for the X coordinate, the Y coordinate, and the rotating angle ω of the connector 120 to be the target values, respectively. In S7614, it is determined whether the X coordinate, the Y coordinate, and the rotating angle ω of the connector 120 have reached the target values, respectively. In the case of denial, the process continues until each value of the X coordinate, the Y coordinate, and the rotating angle ω reaches the target value by repeating the connection control process of the connector 120. In the case of affirmative, the process proceeds to S7616. Since the disconnection of the connector 120 ends, F_CCFN is set to 0. Subsequently, the movement control of the connector 120 ends in S7618, and thus F_CCM is set to 0. Then, the process proceeds to S7620, and a lid closing instruction is transmitted, to the vehicle, to close the lid portion of the power receiving and feeding outlet, and the connector release control process 760 ends.

Further, in a case where the power receiving and feeding equipment is controlled as illustrated in FIGS. 10 and 11, the same control as the flow illustrated in FIG. 18 can be performed by replacing the X and Y coordinates with the R coordinate and the rotating angle θ respectively.

Figure 19:
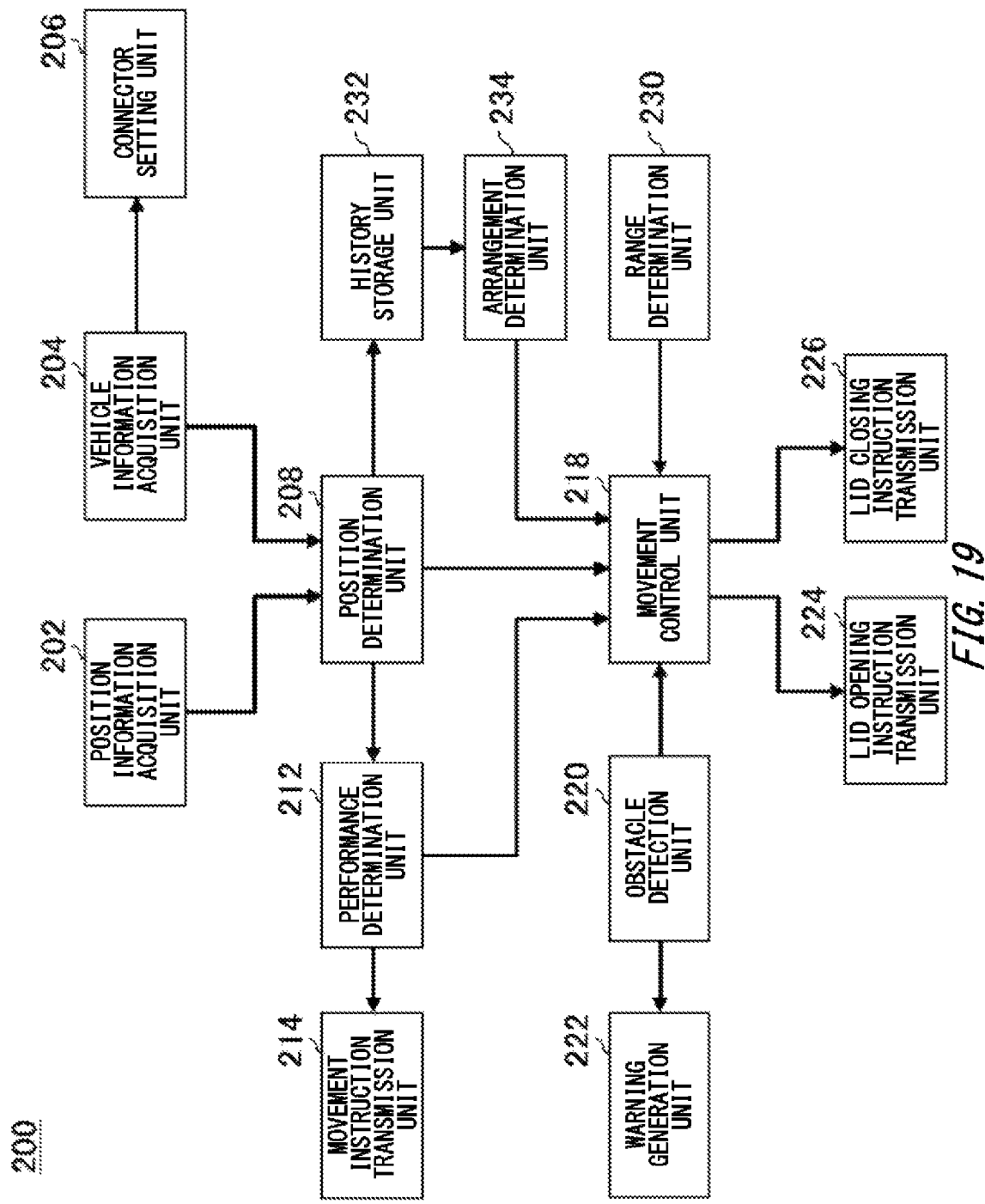
FIG. 19 schematically illustrates an example of a functional configuration of the power receiving and feeding equipment control unit 200.

FIG. 19 schematically illustrates an example of the functional configuration of the power receiving and feeding equipment control unit 200. The power receiving and feeding equipment control unit 200 includes a position information acquisition unit 202, a vehicle information acquisition unit 204, a connector setting unit 206, a position determination unit 208, an performance determination unit 212, a movement instruction transmission unit 214, a movement control unit 218, an obstacle detection unit 220, a warning generation unit 222, a lid opening instruction transmission unit 224, a lid closing instruction transmission unit 226, a range determination unit 230, a history storage unit 232, and an arrangement determination unit 234. Further, it is not necessarily essential that the power receiving and feeding equipment control unit 200 includes all of these configurations.

The position information acquisition unit 202 acquires the position information indicating the position of the vehicle 300. The position information acquisition unit 202 acquires the position information indicating the position of the vehicle 300, for example, by analyzing the image captured by the image capturing apparatus of the power receiving and feeding equipment 100. The position information acquisition unit 202 may receive the vehicle position information from the vehicle 300.

The vehicle information acquisition unit 204 acquires the vehicle information of the vehicle 300. The vehicle information acquisition unit 204 may receive the vehicle information from the vehicle 300.

The connector setting unit 206 sets the connector 120 based on the vehicle information acquired by the vehicle information acquisition unit 204. The connector setting unit 206 may set the connector 120 according to the type of the vehicle 300. For example, the connector setting unit 206 stores the setting of the connector 120 for each type of the vehicle 300, and reads the settings of the connector 120 corresponding to the type of the vehicle 300 indicated by the vehicle information acquired by the vehicle information acquisition unit 204 to set the connector 120 according to the setting.

The position determination unit 208 determines the position of the power receiving and feeding outlet of the vehicle 300 based on the position information acquired by the position information acquisition unit 202 and the vehicle information acquired by the vehicle information acquisition unit 204.

The performance determination unit 212 determines whether to perform the power receiving and feeding of the vehicle 300 by communicating with the vehicle 300. The performance determination unit 212 determines whether to perform the power receiving and feeding of the vehicle 300, for example, based on the position of the power receiving and feeding outlet determined by the position determination unit 208 and the situation around the vehicle 300. For example, in a case where it is determined that there is another vehicle in the vicinity of the power receiving and feeding outlet and thus the path of the connector 120 is blocked, the performance determination unit 212 determines that the power receiving and feeding of the vehicle 300 is not performed.

In a case where the performance determination unit 212 determines that the power receiving and feeding of the vehicle 300 is not possible to perform, the movement instruction transmission unit 214 transmits a movement instruction to the vehicle 300. For example, the movement instruction transmission unit 214 transmits data, which indicates that the parking position change is required to couple the connector 120, to the vehicle 300. The movement instruction transmission unit 214 generates the position information indicating the position of the vehicle 300 where the connector 120 can be coupled to the power receiving and feeding outlet based on the position of the power receiving and feeding outlet and the situation around the vehicle 300, and may transmit the position information to the vehicle 300.

The movement control unit 218 couples the connector 120 to the power receiving and feeding outlet by causing the connector moving unit 110 to move the connector 120 in the vertical direction after moving in the lateral direction at a position higher than a predetermined height, and aligning the connector 120 to the position of the power receiving and feeding outlet of the vehicle 300. In a case where the performance determination unit 212 determines to perform the power receiving and feeding of the vehicle 300, the movement control unit 218 may align the connector 120 to the position of the power receiving and feeding outlet so as to couple the connector 120 thereto. After aligning the connector 120 to the position of the power receiving and feeding outlet, the movement control unit 218 may couple the connector 120 to the power receiving and feeding outlet by causing the connector moving unit 110 to move the connector 120 in the lateral direction. After the power receiving and feeding of the vehicle 300 via the connector 120 is completed, the movement control unit 218 may move the connector 120 to a position higher than a predetermined height.

The obstacle detection unit 220 detects an obstacle against the movement of the connector 120. The obstacle detection unit 220 detects an obstacle, for example, by analyzing the image captured by the image capturing apparatus of the power receiving and feeding equipment 100. In addition, the obstacle detection unit 220 may detect an obstacle against the movement of the connector 120 based on the obstacle information received from the power receiving and feeding equipment 100. In a case where the obstacle detection unit 220 detects an obstacle, the movement control unit 218 may cause the connector moving unit 110 to stop the movement of the connector 120.

The warning generation unit 222 issues a warning when an obstacle is detected by the obstacle detection unit 220. The warning generation unit 222 issues a warning, for example, in a case where the obstacle detected by the obstacle detection unit 220 is a biological object such as a dog or a cat. In a case where the obstacle detected by the obstacle detection unit 220 is a human, the warning generation unit 222 may issue a voice warning about that the connector 120 is prevented from movement.

The lid opening instruction transmission unit 224 transmits the lid opening instruction to the vehicle 300 to open the lid portion of the power receiving and feeding outlet. For example, the movement control unit 218 may cause the lid opening instruction transmission unit 224 to transmit the lid opening instruction to the vehicle 300 before the connector moving unit 110 starts to move the connector 120. In a case where the vehicle 300 does not include a means for performing an automatic opening, a display or a voice guidance may be issued to urge a driver or the like to open the lid.

The lid closing instruction transmission unit 226 transmits the lid closing instruction to the vehicle 300 to close the lid portion of the power receiving and feeding outlet. For example, the lid closing instruction transmission unit 226 transmits the lid closing instruction to the vehicle 300 after the coupling of the connector 120 to the power receiving and feeding outlet is released and the connector 120 is moved. In a case where the vehicle 300 does not include a means for performing an automatic closing, a display or a voice guidance may be issued to urge a driver or the like to close the lid.

Before the connector 120 is coupled to the power receiving and feeding outlet, the range determination unit 230 determines whether the connector 120 is within a range of movement of the door of another vehicle when the connector 120 is coupled to the power receiving and feeding outlet. The range determination unit 230 performs determination, for example, based on the image information of the vehicle which is received from the power receiving and feeding equipment 100. The movement control unit 218 may cause the connector moving unit 110 to stop the movement of the connector 120 in a case where the range determination unit 230 determines that the connector 120 is within the range of movement of the door of another vehicle. Thus, it is possible to prevent contact with the connector 120 due to the door opening of another vehicle during coupling the connector 120 to the power receiving and feeding outlet.

The history storage unit 232 stores a history of the position of the power receiving and feeding outlet which is determined by the position determination unit 208. The arrangement determination unit 234 determines an initial arrangement of the connector 120 by analyzing the history stored in the history storage unit 232. For example, the arrangement determination unit 234 identifies a region which is highly likely to be the position of the power receiving and feeding outlet from the history stored in the history storage unit 232, and determines the shortest position to the region as the initial position of the connector 120. After the power receiving and feeding of the vehicle 300 via the connector 120 is completed, the movement control unit 218 may move the connector 120 to the initial position determined by the arrangement determination unit 234. Thus, it is possible to lower the amount of movement of the connector 120 in a case where the vehicle 300 is disposed later in the power receiving and feeding area 102.

Figure 20:
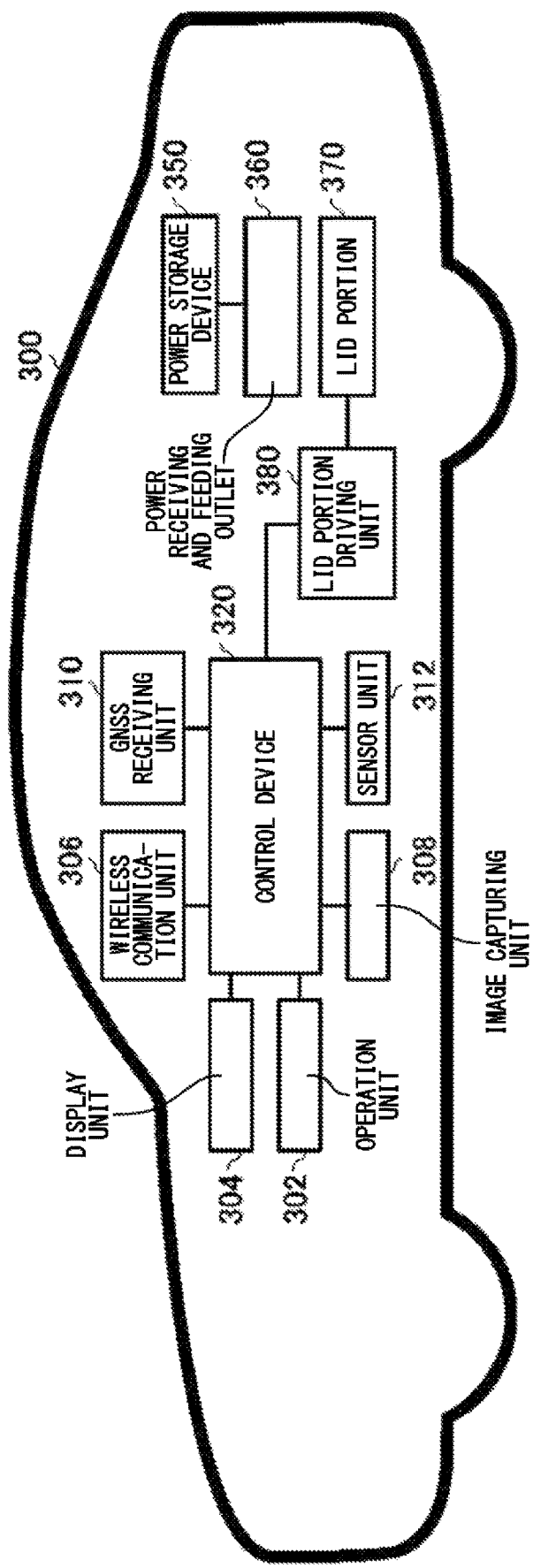
FIG. 20 schematically illustrates an example of the configuration of a vehicle 300.

FIG. 20 schematically illustrates an example of the configuration of a vehicle 300. The vehicle 300 includes an operation unit 302, a display unit 304, a wireless communication unit 306, an image capturing unit 308, a GNSS (Global Navigation Satellite System) receiving unit 310, a sensor unit 312, a control device 320, a power storage device 350, a power receiving and feeding outlet 360, a lid portion 370, and a lid portion driving unit 380. Further, it is not necessarily essential that the vehicle 300 includes all of these configurations.

The operation unit 302 receives an operation by the user of the vehicle 300. The operation unit 302 may include physical operation buttons. The operation unit 302 and the display unit 304 may be a touch panel display. The operation unit 302 may receive a voice operation. The operation unit 302 may include a microphone and a speaker.

The wireless communication unit 306 executes wireless communication with the outside. The wireless communication unit 306 communicates with, for example, the power receiving and feeding equipment control unit 200.

The image capturing unit 308 includes one or more cameras. The camera may be a dashcam. When the image capturing unit 308 includes a plurality of cameras, each of the plurality of cameras is disposed at a different position in the vehicle 300. In addition, each of the plurality of cameras captures an image in a different image capturing direction.

The GNSS receiving unit 310 receives radio waves transmitted from a GNSS satellite. The GNSS receiving unit 310 may identify the position of the vehicle 300 based on a signal received from the GNSS satellite.

The sensor unit 312 includes one or more sensors. The sensor unit 312 includes, for example, an acceleration sensor. The sensor unit 312 includes, for example, an angular velocity sensor (gyro sensor). The sensor unit 312 includes, for example, a geomagnetic sensor. The sensor unit 312 includes, for example, a vehicle speed sensor. In addition, the sensor unit 312 includes an external sensor. An example of the external sensor includes a radar, an ultrasonic sensor, an infrared sensor, a LIDAR (Light Detection and Ranging), and the like.

The radar radiates radio waves such as millimeter waves around the vehicle 300, and detects radio waves (reflected waves) reflected by an object so as to detect at least the position (distance and direction) of the object. One or more radars are attached to any place of the vehicle 300. The radar may detect the position and the speed of the object by the FM-CW (Frequency Modulated Continuous Wave) method.

The LIDAR radiates light around the vehicle 300 and measures scattered light. The LIDAR detects the distance to the target based on the time from light emission to light reception. The light to be radiated is, for example, a pulse shaped laser beam. One or more LIDARs are attached to any place of the vehicle 300.

The control device 320 controls the operation unit 302, the display unit 304, the wireless communication unit 306, the image capturing unit 308, the GNSS receiving unit 310, and the sensor unit 312 so as to execute various types of processes. The control device 320 executes, for example, a navigation process. The control device 320 may execute a navigation process similar to a navigation process executed by a known car navigation system. For example, the control device 320 identifies the current position of the vehicle 300 based on outputs from the GNSS receiving unit 310 and the sensor unit 312, and reads map data corresponding to the current position so as to cause the display unit 304 to display the data. In addition, the control device 320 receives an input of a destination via the operation unit 302, and identifies a recommended route from the current position of the vehicle 300 to the destination so as to cause the display unit 304 to display the route. When the control device 320 receives selection of the route, the control device 320 gives guidance on a path for the vehicle 300 to travel via the display unit 304 and the speaker according to the selected route.

In addition, the control device 320 executes an information transmitting and receiving process of transmitting and receiving various types of information to and from the power receiving and feeding equipment control unit 200. For example, the control device 320 transmits, to the power receiving and feeding equipment control unit 200 via the wireless communication unit 306, vehicle type information indicating the vehicle type of the vehicle 300, vehicle information containing the dimension of the vehicle 300, the position of the power receiving and feeding outlet, and the like, power receiving and feeding information containing a power receiving and feeding request and the like, vehicle position information indicating the position of the vehicle 300, and the like.

In addition, the control device 320 receives, for example, the movement instruction, the lid opening instruction, the lid closing instruction, and the like, from the power receiving and feeding equipment control unit 200 via the wireless communication unit 306. In addition, the control device 320 receives, for example, the image captured by the image capturing apparatus of the power receiving and feeding equipment 100, from the power receiving and feeding equipment control unit 200 via the wireless communication unit 306. In addition, the control device 320 receives, for example, the obstacle information indicating the position, the type, and the like of the obstacle detected by the obstacle detection unit 220, from the power receiving and feeding equipment control unit 200 via the wireless communication unit 306.

In addition, the control device 320 executes, for example, an automatic driving process of the vehicle 300. The control device 320 recognizes the positions, the types, the speeds, and the like of objects in the vicinity based on outputs of the image capturing unit 308 and the sensor unit 312. Then, a recognition result is used to control traveling, stopping, rotating, and the like of the own vehicle without depending on driver's steering, accelerator operating, brake pedal operating, speed change steering, and the like. The control device 320 causes, for example, the vehicle 300 to move by automatic driving according to the movement instruction received from the power receiving and feeding equipment control unit 200.

The power storage device 350 may be a so-called in-vehicle battery. The power storage device 350 stores, for example, power supplied from the power receiving and feeding equipment 100 via the power receiving and feeding outlet 360. In addition, the power storage device 350 supplies drive power to the vehicle 300, and supplies power to each component of the vehicle 300.

The lid portion driving unit 380 drives the lid portion 370 of the power receiving and feeding outlet 360. The control device 320 causes, for example, the lid portion driving unit 380 to open the lid portion 370 when a lid opening instruction to open the lid portion 370 is received from the power receiving and feeding equipment control unit 200. In addition, the control device 320 causes, for example, the lid portion driving unit 380 to close the lid portion 370 when a lid closing instruction to close the lid portion 370 is received from the power receiving and feeding equipment control unit 200.

Figure 21:
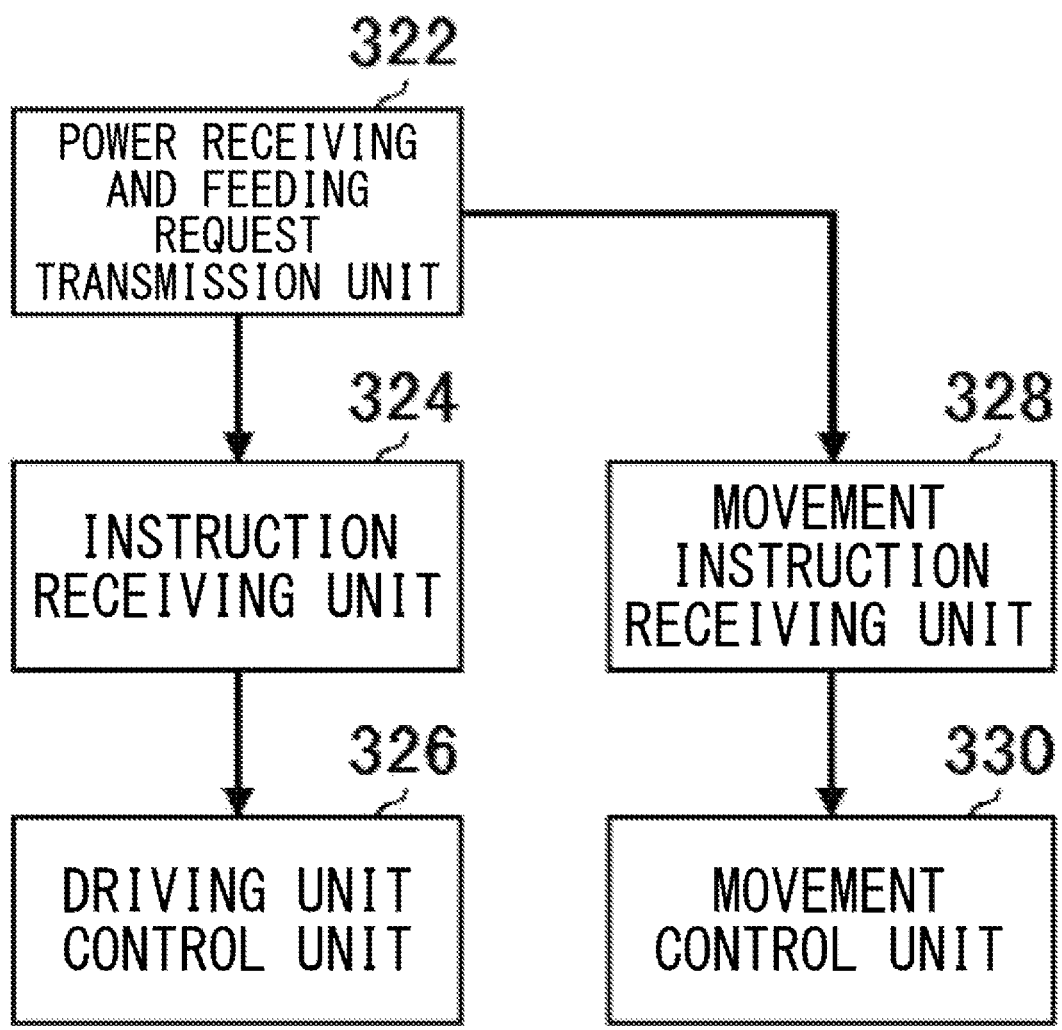
FIG. 21 schematically illustrates an example of a functional configuration of a control device 320.

FIG. 21 schematically illustrates an example of a functional configuration of a control device 320. The control device 320 includes a power receiving and feeding request transmission unit 322, an instruction receiving unit 324, a driving unit control unit 326, a movement instruction receiving unit 328, and a movement control unit 330. Further, it is not necessarily essential that the control device 320 includes all of these configurations.

The power receiving and feeding request transmission unit 322 transmits a power receiving and feeding request to the power receiving and feeding equipment 100. The power receiving and feeding request transmission unit 322 may transmit the power receiving and feeding request to the power receiving and feeding equipment control unit 200 of the power receiving and feeding equipment 100.

The instruction receiving unit 324 receives an instruction from the power receiving and feeding equipment control unit 200 that has received the power receiving and feeding request transmitted by the power receiving and feeding request transmission unit 322. The instruction receiving unit 324 receives, for example, a lid opening instruction to open the lid portion 370 of the power receiving and feeding outlet 360. The instruction receiving unit 324 may be an example of the lid opening instruction receiving unit. In addition, the instruction receiving unit 324 receives, for example, a lid closing instruction to close the lid portion 370 of the power receiving and feeding outlet 360. The instruction receiving unit 324 may be an example of the lid closing instruction receiving unit.

The driving unit control unit 326 controls the lid portion driving unit 380. The driving unit control unit 326 causes the lid portion driving unit 380 to open the lid portion 370 in response to the instruction receiving unit 324 receiving the lid opening instruction. In addition, the driving unit control unit 326 causes the lid portion driving unit 380 to close the lid portion 370 in response to the instruction receiving unit 324 receiving the lid closing instruction.

The movement instruction receiving unit 328 receives a movement instruction from the power receiving and feeding equipment control unit 200 that has received the power receiving and feeding request transmitted by the power receiving and feeding request transmission unit 322. For example, when the power receiving and feeding equipment control unit 200 determines that the power receiving and feeding of the vehicle 300 is not possible to perform based on the position of the power receiving and feeding outlet 360 of the vehicle 300, and the situation around the vehicle 300, the power receiving and feeding equipment control unit 200 transmits the movement instruction to the vehicle 300. The movement instruction receiving unit 328 receives the movement instruction. The movement instruction includes, for example, a movement destination position indicating a movement destination for a situation in which the power receiving and feeding of the vehicle 300 is possible to perform. In addition, the movement instruction may include a movement path to the movement destination for the situation in which the power receiving and feeding of the vehicle 300 is possible to perform. The movement path may include a movement direction, the amount of movement, the amount of rotation, and the like.

The movement control unit 330 causes the vehicle 300 to move according to the movement instruction received by the movement instruction receiving unit 328. The movement control unit 330 causes the vehicle 300 to move to the movement destination position included in the movement instruction while referring to the positions, the types, the speeds, and the like of the objects in the vicinity which are recognized based on the outputs of the image capturing unit 308 and the sensor unit 312. In addition, the movement control unit 330 causes the vehicle 300 to move according to the movement path included in the movement instruction.

Figure 22:
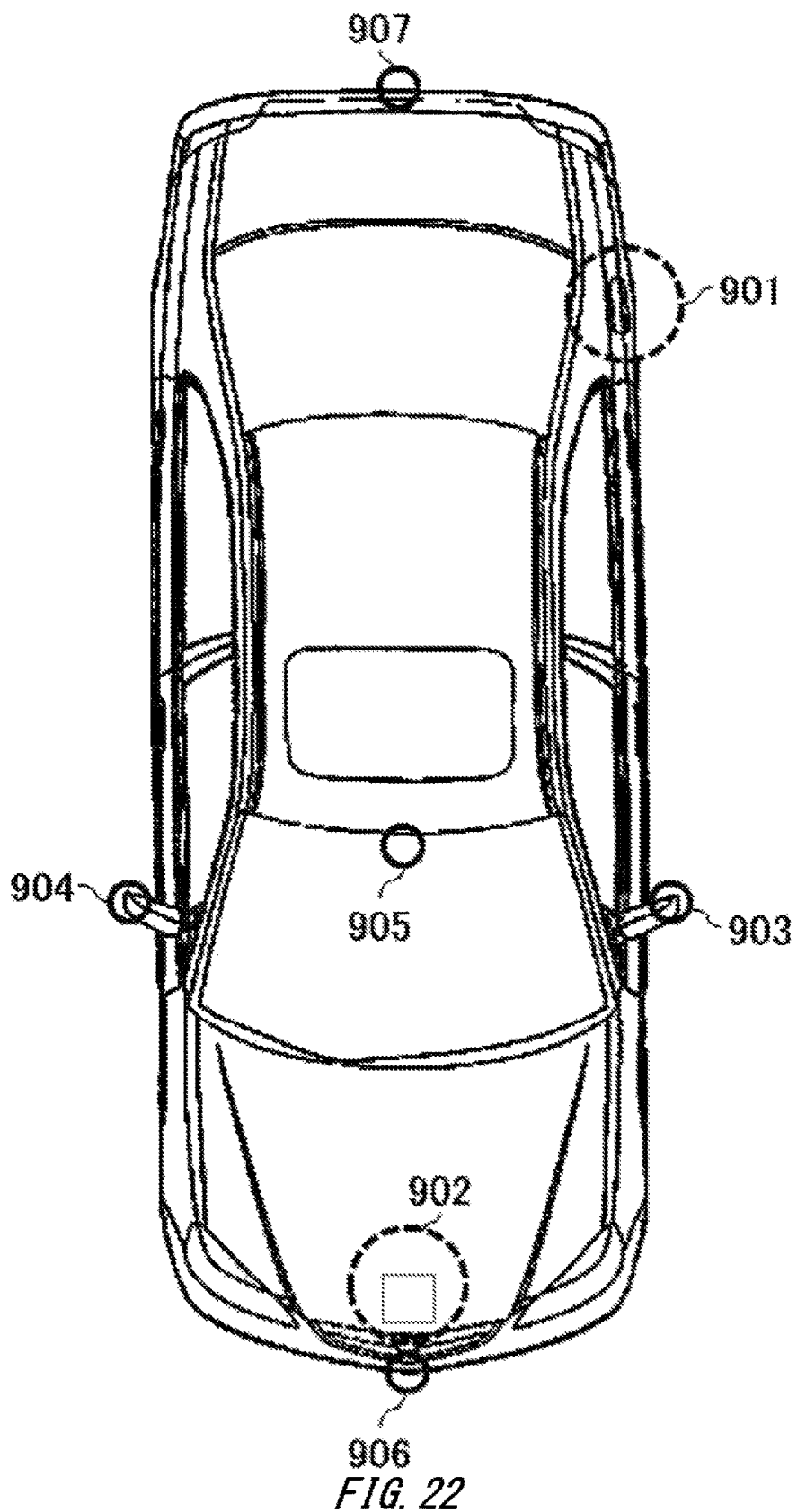
FIG. 22 schematically illustrates an arrangement example of a power receiving and feeding outlet and an external sensor of a vehicle 800.

FIG. 22 schematically illustrates an arrangement example of a power receiving and feeding outlet and an external sensor of a vehicle 800. The vehicle 800 is an electric motor vehicle. The vehicle 800 may function as the vehicle 300 described above. The vehicle 800 enables power receiving and feeding of any power receiving and feeding apparatus to be performed without being limited to the power receiving and feeding equipment 100 described above.

A position 901 and a position 902 indicate the positions of the power receiving and feeding outlets of the vehicle 800. The vehicle 800 may include the power receiving and feeding outlet at either the position 901 or the position 902. The vehicle 800 may include the power receiving and feeding outlet at both of the position 901 and the position 902. The position 901 and the position 902 illustrated in FIG. 22 are examples, and the vehicle 800 may include the power receiving and feeding outlet at a position other than the position 901 and the position 902.

A position 903, a position 904, a position 905, a position 906, and a position 907 indicate the positions of external sensors of the vehicle 800. An example of the external sensor includes an image capturing unit, a radar, an infrared sensor, an ultrasonic sensor, and the like. The position 903 and the position 904 may be below side-view mirrors. The position 905 may be inside a windshield. The position 906 and the position 907 may be below bumpers.

The vehicle 800 may include the external sensor at at least any position of the position 903, the position 904, the position 905, the position 906, and the position 907. The vehicle 800 may include the external sensor at all positions of the position 903, the position 904, the position 905, the position 906, and the position 907. The position 903, the position 904, the position 905, the position 906, and the position 907 illustrated in FIG. 22 are examples, and the number of external sensors may be any number, or the vehicle 800 may include the external sensor at a position other than the position 903, the position 904, the position 905, the position 906, and the position 907.

When the position of the power receiving and feeding outlet is the position 901, the state of the power receiving and feeding outlet, and the lid portion of the power receiving and feeding outlet can be monitored mainly based on information obtained by the external sensor at the position 903. When the position of the power receiving and feeding outlet is the position 902, the states of the power receiving and feeding outlet, and the lid portion of the power receiving and feeding outlet can be monitored mainly based on information obtained by the external sensor at the position 906. In addition, the lid portion of the power receiving and feeding outlet may be monitored in the system for monitoring the vicinity of the vehicle 800 from information of a plurality of external sensors. This case may be premised on a system that composites images of the vicinity of the vehicle viewed from above, based on the information from a plurality of cameras. The external sensor included in the vehicle 800 may be an example of a monitoring unit that monitors the power receiving and feeding outlet and the lid portion of the power receiving and feeding outlet.

The vehicle 800 may communicate with the power receiving and feeding apparatus that performs the power receiving and feeding of the vehicle 800 so as to monitor the states of the power receiving and feeding outlet, and the lid portion of the power receiving and feeding outlet based on information obtained by the external sensor included in the power receiving and feeding apparatus. The external sensor included in the power receiving and feeding apparatus may be an example of a monitoring unit that monitors the power receiving and feeding outlet and the lid portion of the power receiving and feeding outlet.

Figure 23:
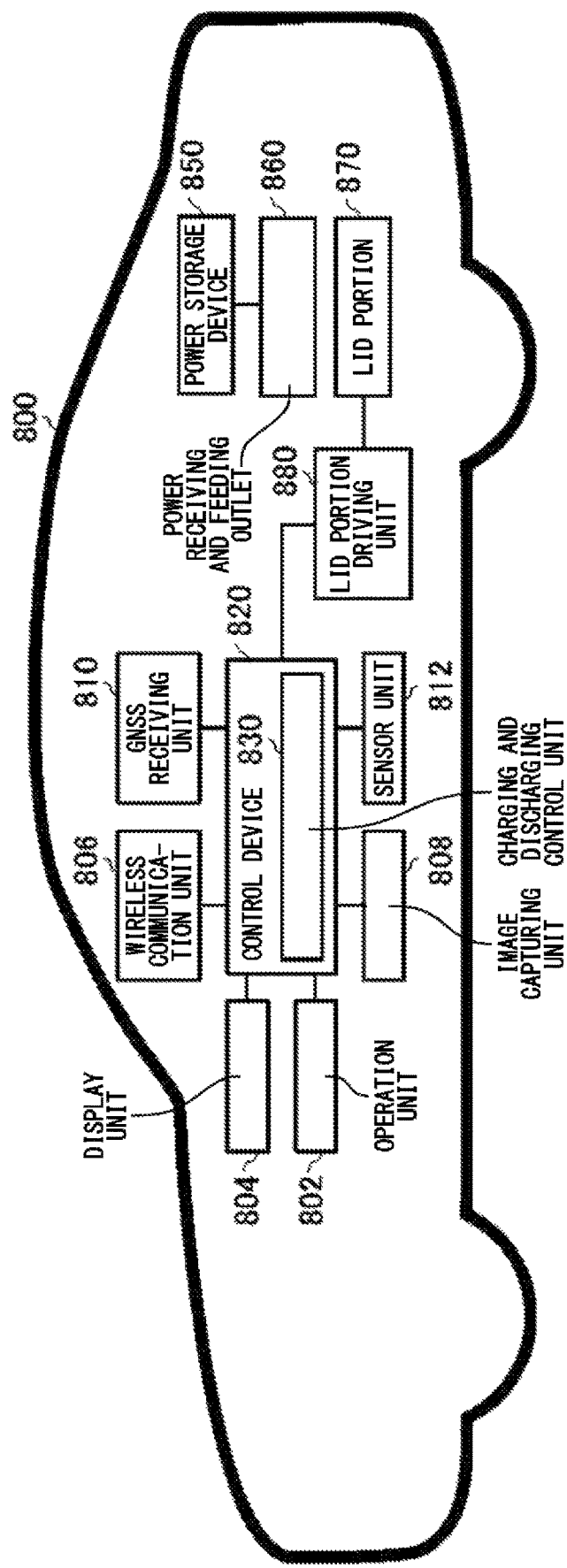
FIG. 23 schematically illustrates an example of a configuration of the vehicle 800.

FIG. 23 schematically illustrates an example of a configuration of the vehicle 800. The vehicle 800 includes an operation unit 802, a display unit 804, a wireless communication unit 806, an image capturing unit 808, a GNSS receiving unit 810, a sensor unit 812, a control device 820, a power storage device 850, a power receiving and feeding outlet 860, a lid portion 870, and a lid portion driving unit 880. The operation unit 802, the display unit 804, the wireless communication unit 806, the image capturing unit 808, the GNSS receiving unit 810, the sensor unit 812, the power storage device 850, the power receiving and feeding outlet 860, the lid portion 870, and the lid portion driving unit may be similar to the operation unit 302, the display unit 304, the wireless communication unit 306, the image capturing unit 308, the GNSS receiving unit 310, the sensor unit 312, the power storage device 350, the power receiving and feeding outlet 360, the lid portion 370, and the lid portion driving unit 380.

The control device 820 may execute a navigation process similarly to the control device 320. The control device 820 may execute, similarly to the control device 320, an information transmitting and receiving process of transmitting and receiving various types of information to and from the power receiving and feeding equipment control unit 200. The control device 820 may execute an automatic driving process of the vehicle 800 similarly to the control device 320.

The control device 820 has a charging and discharging control unit 830. The charging and discharging control unit 830 controls, for example, a drive of the lid portion driving unit 880 in response to a signal from the power receiving and feeding apparatus. The charging and discharging control unit 830 causes, for example, the lid portion driving unit 880 to open the lid portion 870 in response to receiving a lid opening instruction to open the lid portion 870 from the power receiving and feeding apparatus. In addition, the charging and discharging control unit 830 causes, for example, the lid portion driving unit 880 to close the lid portion 870 in response to receiving a lid closing instruction to close the lid portion 870 from the power receiving and feeding apparatus.

The charging and discharging control unit 830 may control the drive of the lid portion 870 by the lid portion driving unit 880 according to a monitoring result of the power receiving and feeding outlet 860 and the lid portion 870 obtained by the external sensor. The charging and discharging control unit 830 may acquire a monitoring result of an external sensor included in the vehicle 800. In addition, the charging and discharging control unit 830 may receive a monitoring result of an external sensor included in the power receiving and feeding apparatus from the power receiving and feeding apparatus.

For example, in a case where an obstacle exists around the lid portion 870 when the charging and discharging control unit 830 causes the lid portion 870 to be opened, the charging and discharging control unit 830 causes opening of the lid portion 870 by the lid portion driving unit 880 to be stopped. Then, the charging and discharging control unit 830 executes an obstacle removing process of removing the obstacle.

When the obstacle is a power receiving and feeding connector of the power receiving and feeding apparatus, the charging and discharging control unit 830 may instruct the power receiving and feeding apparatus to move the power receiving and feeding connector. When the obstacle is a person, the charging and discharging control unit 830 may output a warning. In addition, when the obstacle is a vehicle, the charging and discharging control unit 830 may transmit a movement instruction to the vehicle. When the type of obstacle cannot be identified, the charging and discharging control unit 830 outputs, for example, the warning. After the obstacle removal process is executed, in a case where it is confirmed that the obstacle has been removed, the charging and discharging control unit 830 causes the lid portion driving unit 880 to open the lid portion 870.

In addition, for example, in a case where an obstacle exists around the lid portion 870 when the charging and discharging control unit 830 causes the lid portion 870 to be closed, the charging and discharging control unit 830 causes closing of the lid portion 870 by the lid portion driving unit 880 to be stopped. Then, the charging and discharging control unit 830 executes an obstacle removing process of removing the obstacle. After the obstacle removal process is executed, in a case where it is confirmed that the obstacle has been removed, the charging and discharging control unit 830 causes the lid portion driving unit 880 to close the lid portion 870.

Figure 24:
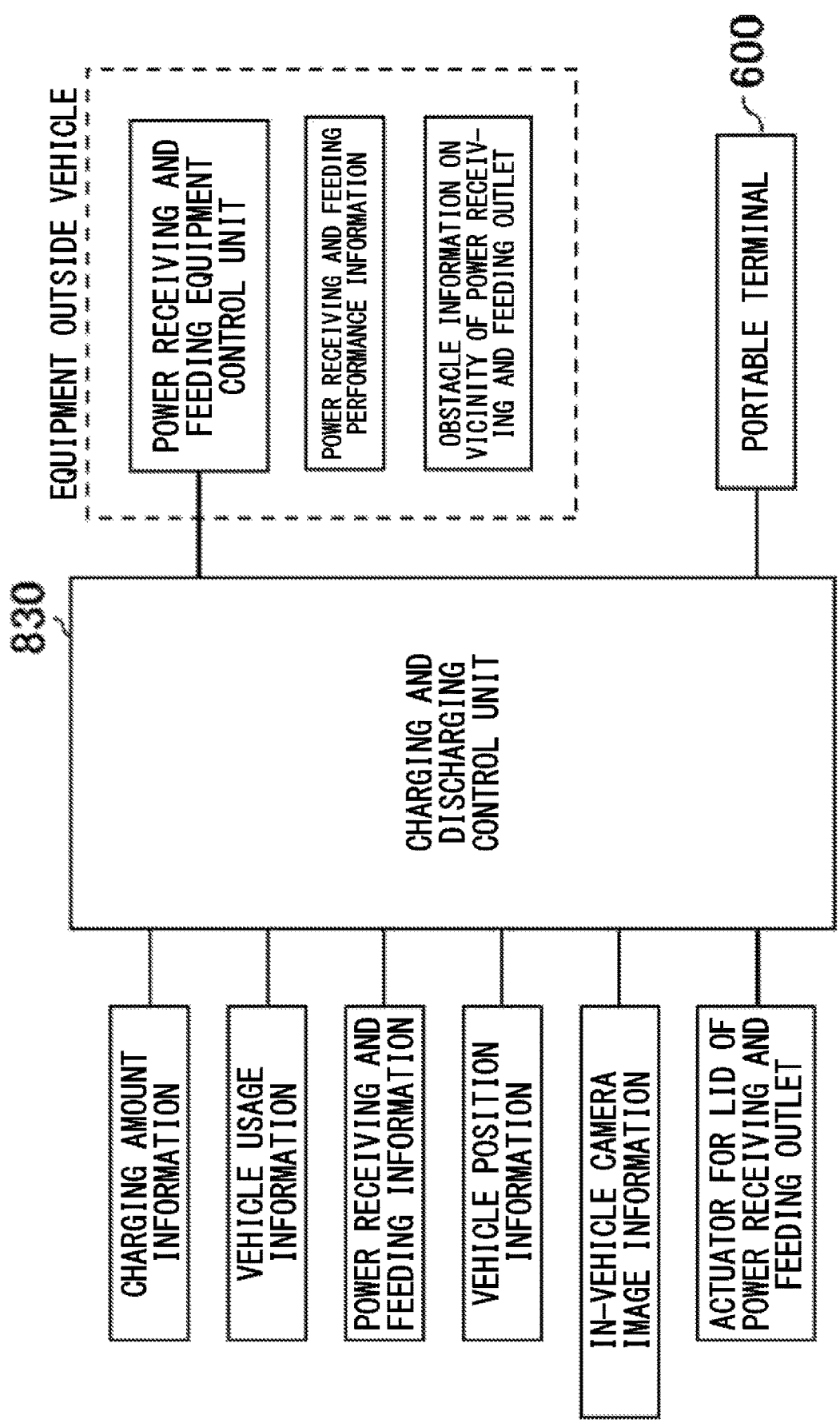
FIG. 24 schematically illustrates an example of a communication environment of a charging and discharging control unit 830.

FIG. 24 schematically illustrates an example of a communication environment of a charging and discharging control unit 830. The charging and discharging control unit 830 may acquire various types of information relating to the vehicle 800 from various components included in the vehicle 800.

For example, the charging and discharging control unit 830 acquires charging amount information indicating a charging amount of the power storage device 850, vehicle usage information indicating a status of use of the vehicle 800, power receiving and feeding information indicating a status of the power receiving and feeding of the power storage device 850, vehicle position information indicating the position of the vehicle 800, and in-vehicle camera image information including an image captured by the image capturing unit 808. In addition, the vehicle 800 acquires information indicating a status of the lid portion 870 and a status of an actuator that functions as the lid portion driving unit 880.

In addition, the charging and discharging control unit 830 transmits and receives various types of information to and from equipment outside the vehicle. The charging and discharging control unit 830 transmits, for example, various types of information about the vehicle 800 to the power receiving and feeding equipment control unit 200, and receives various types of information relating to the power receiving and feeding equipment control unit 200 from the power receiving and feeding equipment control unit 200. The charging and discharging control unit 830 receives, from the power receiving and feeding equipment control unit 200 for example, power receiving and feeding performance information indicating a status of power receiving and feeding performed, obstacle information on the vicinity of the power receiving and feeding outlet 860 detected by the power receiving and feeding equipment control unit 200, and the like.

In addition, the charging and discharging control unit 830 transmits and receives various types of information to and from the portable terminal 600. The portable terminal 600 is, for example, a terminal used by the owner of the vehicle 800. The charging and discharging control unit 830 transmits, for example, a status of charging of the vehicle 800 to the portable terminal 600. As a specific example, the charging and discharging control unit 830 transmits information such as the degree of completion of charging the power storage device 850 of the vehicle 800, the time to be taken for fully charging the vehicle 800, and the like to the portable terminal 600.

Figure 25:
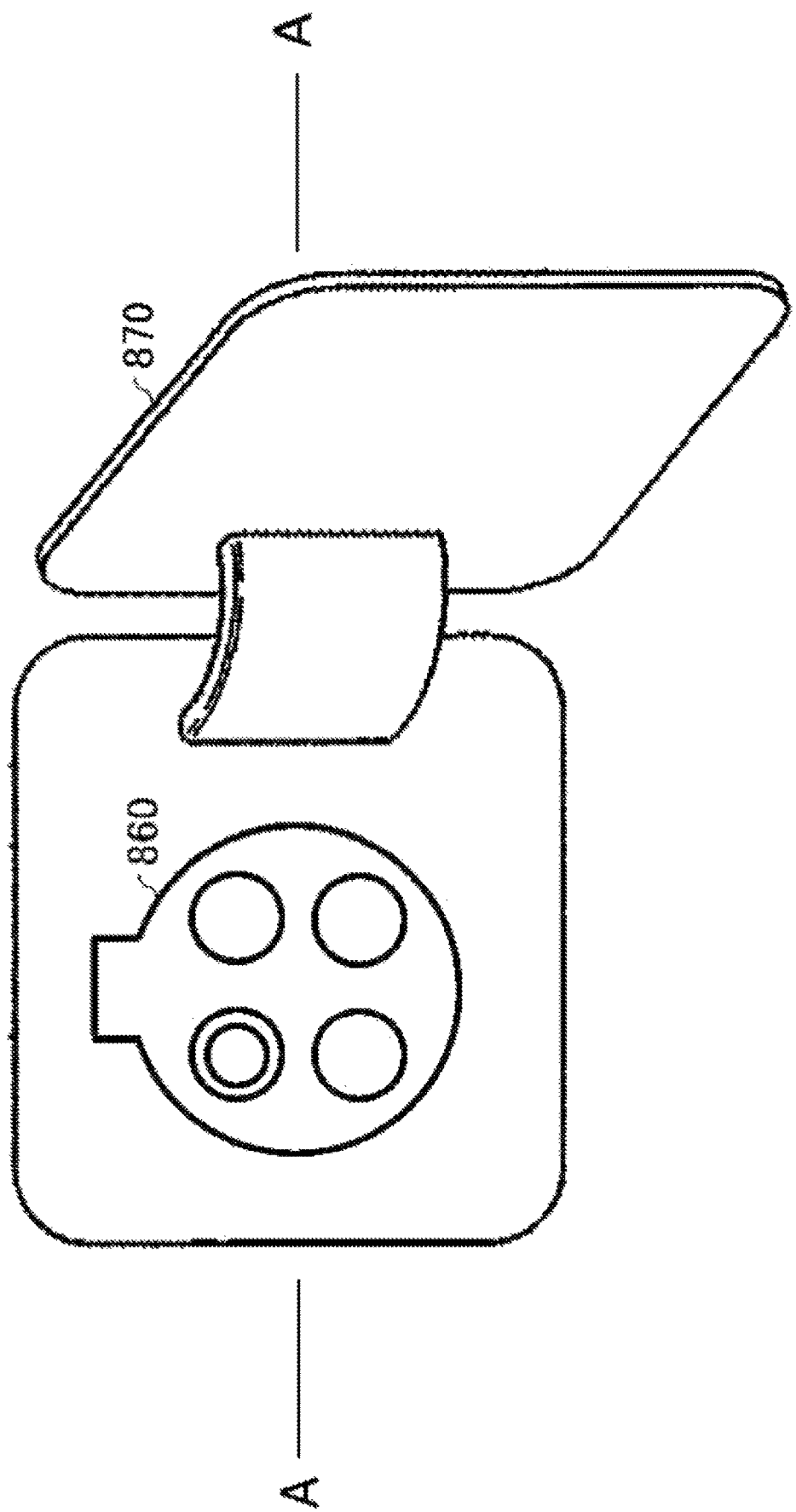
FIG. 25 schematically illustrates an example of an appearance of a power receiving and feeding outlet 860 and a lid portion 870.
Figure 26:
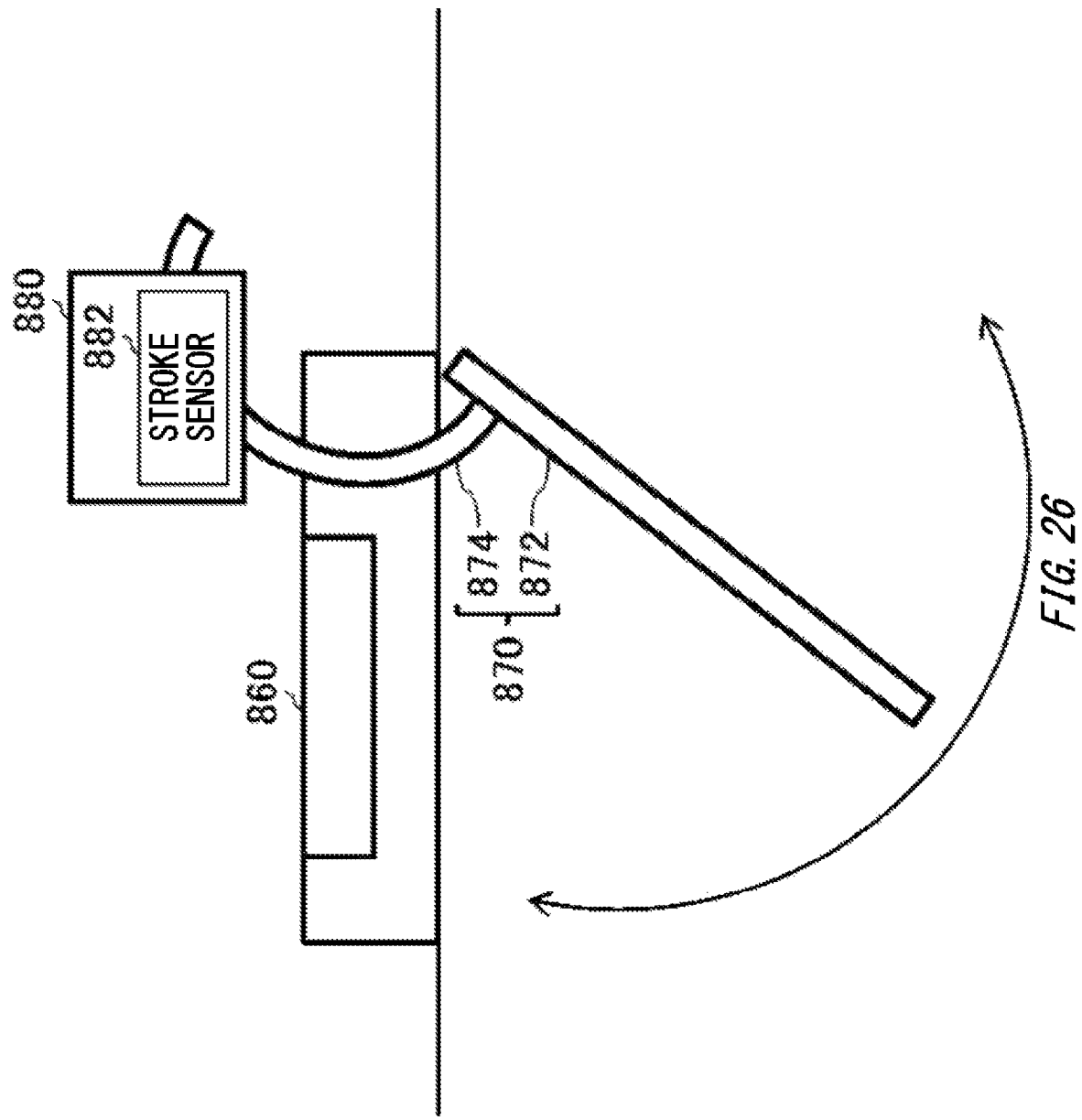
FIG. 26 illustrates an example of a cross-sectional view A-A of the power receiving and feeding outlet 860 and the lid portion 870.

FIG. 25 schematically illustrates an example of an appearance of a power receiving and feeding outlet 860 and a lid portion 870. FIG. 26 illustrates an example of a cross-sectional view A-A of the power receiving and feeding outlet 860 and the lid portion 870.

In the example illustrated in FIG. 26, the lid portion 870 has a lid 872 and an arm 874. The lid portion driving unit 880 moves, for example, the lid 872 by driving the arm 874 by the actuator so as to open and close the lid 872. In the example illustrated in FIG. 26, the lid portion driving unit 880 has a stroke sensor 882 that detects a movement of the arm 874. The charging and discharging control unit 830 detects, for example, the opening and closing of the lid 872 by acquiring a detection result obtained by the stroke sensor 882.

Figure 27:
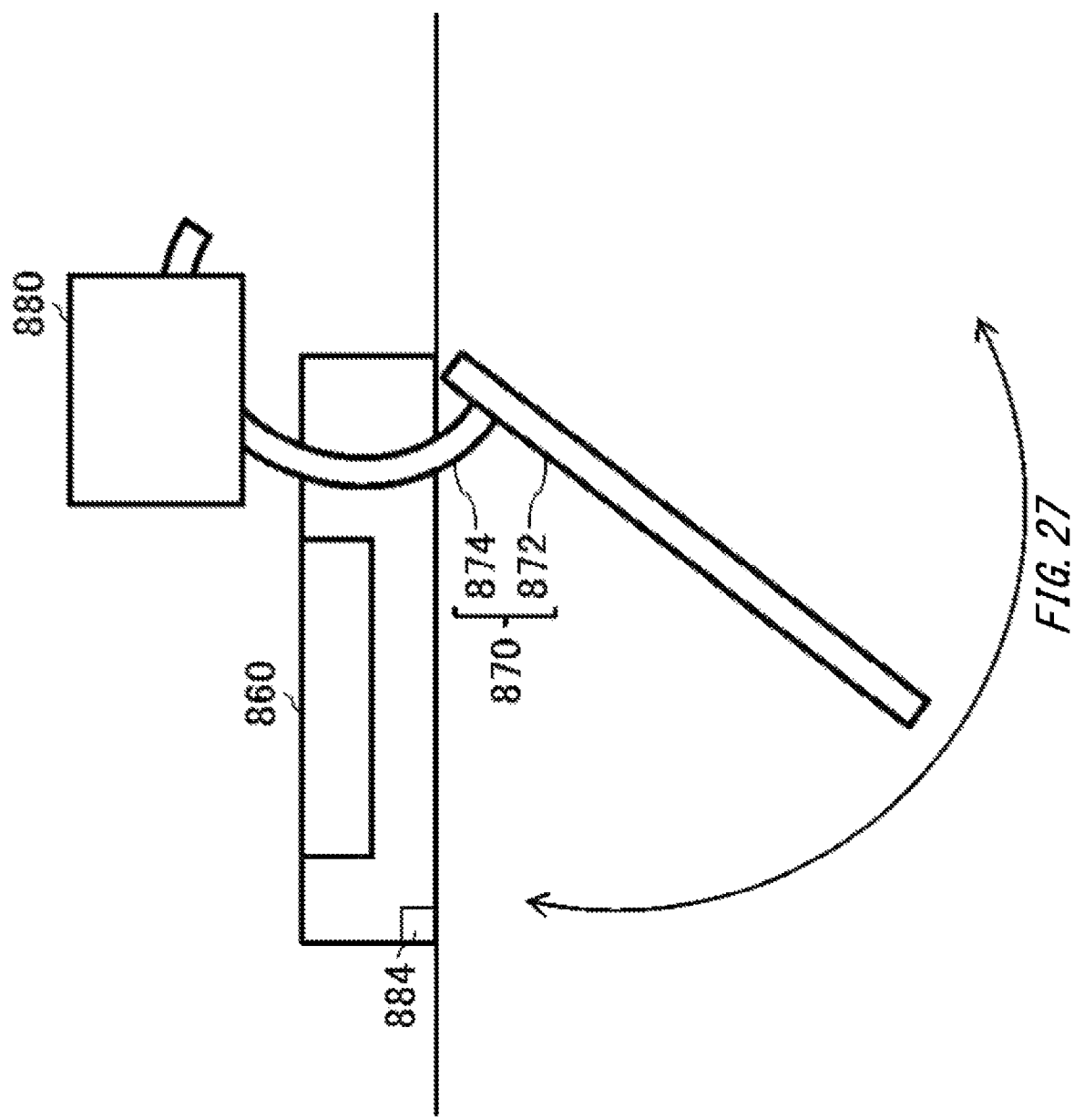
FIG. 27 illustrates an example of a cross-sectional view A-A of the power receiving and feeding outlet 860 and the lid portion 870.

FIG. 27 illustrates another example of a cross-sectional view A-A of the power receiving and feeding outlet 860 and the lid portion 870. Here, differences from FIG. 26 will be mainly described. In the example illustrated in FIG. 27, the lid portion driving unit 880 does not have the stroke sensor 882, and an opening and closing switch 884 that detects the opening and closing of the lid 872 is set on the power receiving and feeding outlet 860 side. The opening and closing switch 884 issues a signal at at least any of the opening position of the lid 872 and the closing position of the lid 872. The charging and discharging control unit 830 detects, for example, the opening and closing of the lid 872 by receiving the signal issued by the opening and closing switch 884.

The detections of the opening and closing of the lid 872 illustrated in FIGS. 26 and 27 are examples, and the charging and discharging control unit 830 may detect the opening and closing of the lid 872 by a method other than these. For example, the charging and discharging control unit 830 detects the opening and closing of the lid 872 based on sensor information obtained by at least any of the external sensor of the vehicle 800 and the external sensor of the power receiving and feeding apparatus.

Figure 28:
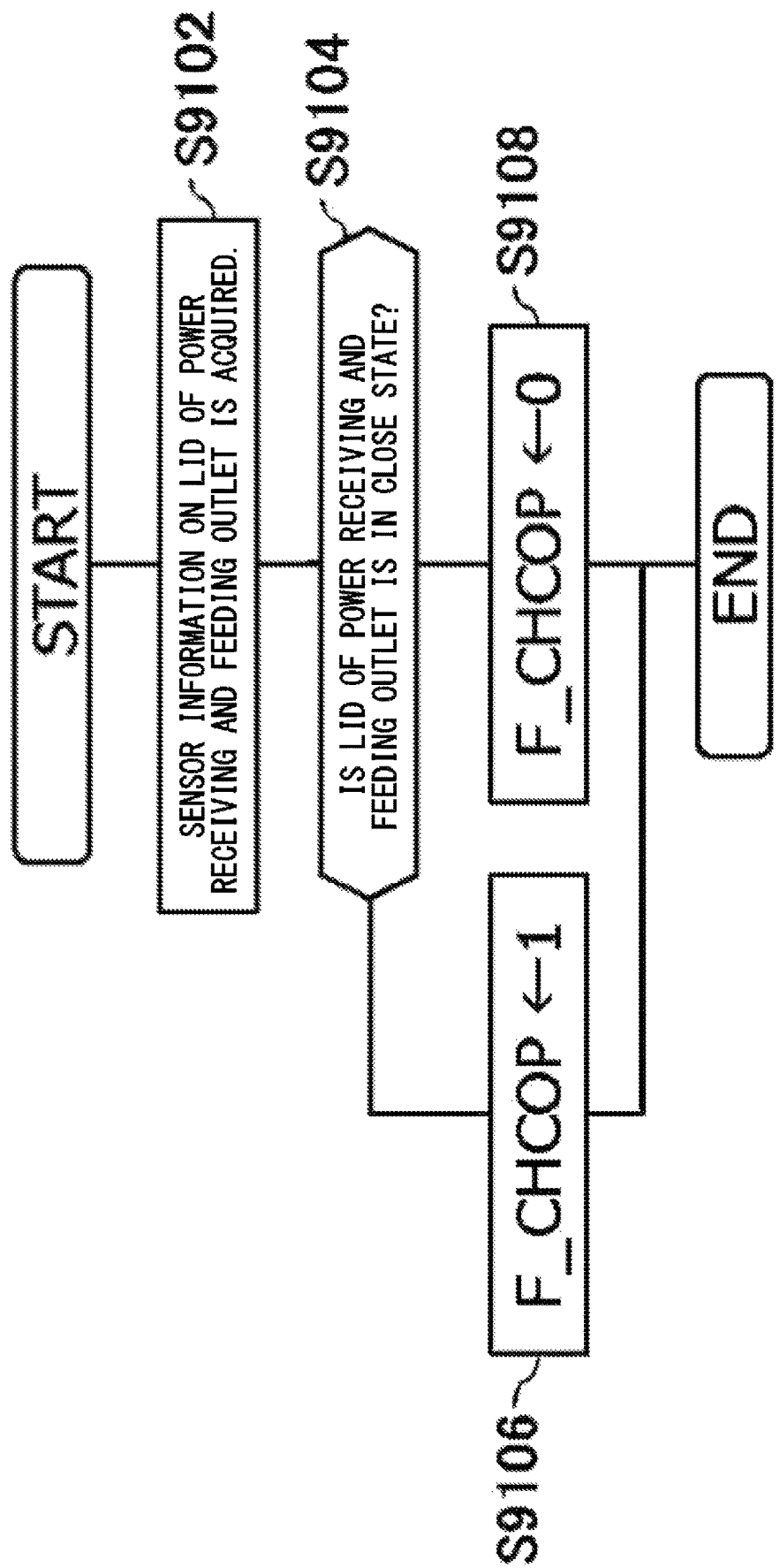
FIG. 28 schematically illustrates an example of a power receiving and feeding outlet lid state determination process 910.

FIG. 28 schematically illustrates an example of a power receiving and feeding outlet lid state determination process 910. The process illustrated in FIG. 28 may be mainly performed by a controller of the charging and discharging control unit 830.

In S9102, sensor information on the lid portion 870 of the power receiving and feeding outlet 860 is acquired. The charging and discharging control unit 830 acquires, for example, sensor information detected by the stroke sensor 882. In addition, the charging and discharging control unit 830 acquires, for example, sensor information detected by the opening and closing switch 884. In addition, the charging and discharging control unit 830 acquires the sensor information obtained by at least any of the external sensor of the vehicle 800 and the external sensor of the power receiving and feeding apparatus.

In S9104, it is determined whether the lid portion 870 of the power receiving and feeding outlet 860 is in an open state. If the open state is determined, F_CHCOP is set to 1 (S9106), and if the open state is not determined, F_CHCOP is set to 0 (S9108). F_CHCOP is a flag indicating whether the lid portion 870 is in the open state or the closed state, and 1 corresponds to the lid being opened and 0 corresponds to the lid being closed.

Figure 29:
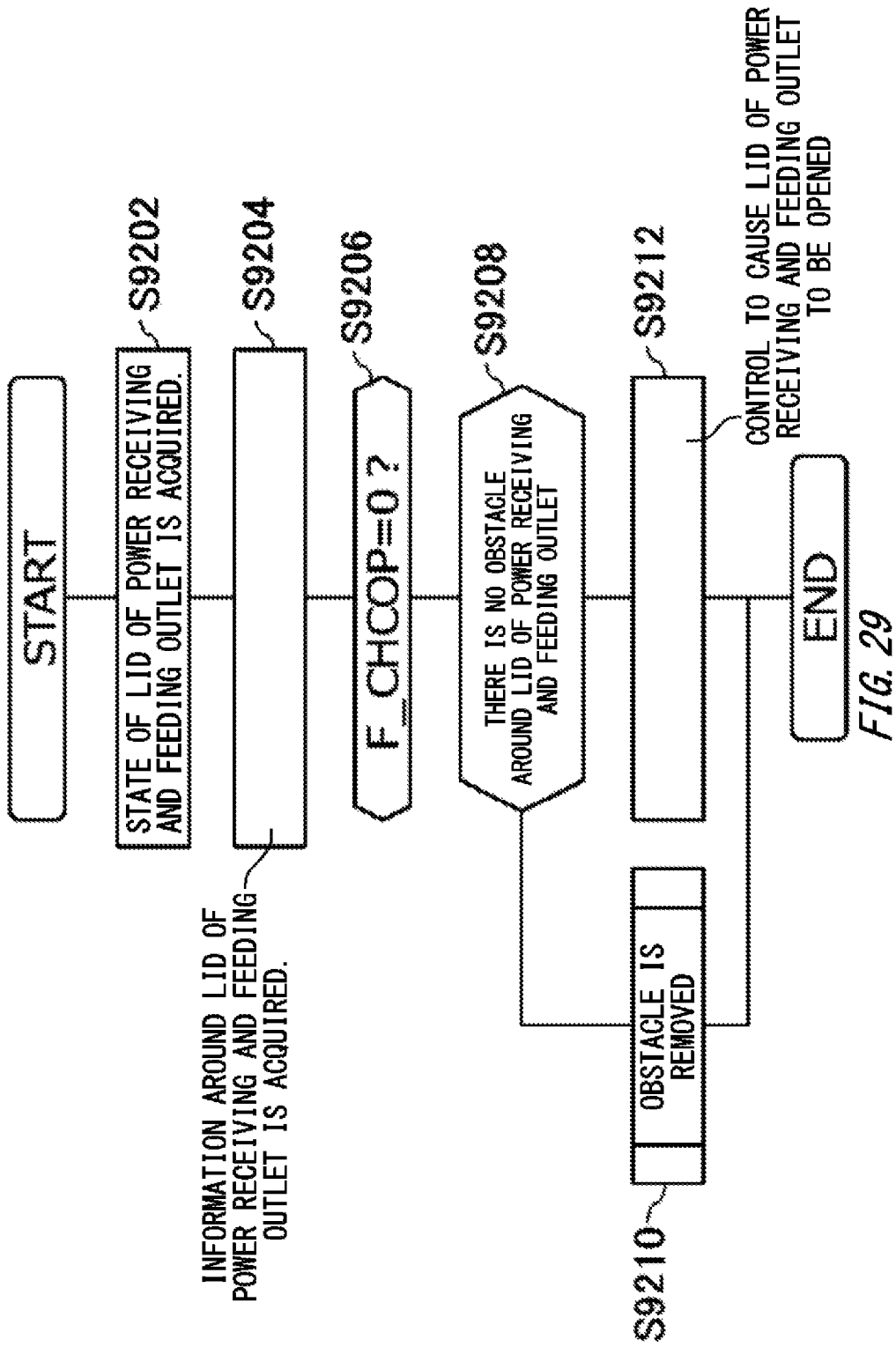
FIG. 29 schematically illustrates an example of a power receiving and feeding outlet lid opening control process 920.

FIG. 29 schematically illustrates an example of a power receiving and feeding outlet lid opening control process 920. The process illustrated in FIG. 29 may be mainly performed by the controller of the charging and discharging control unit 830.

In S9202, the state of the lid portion 870 of the power receiving and feeding outlet 860 is acquired. In S9204, information around the lid portion 870 of the power receiving and feeding outlet 860 is acquired. The charging and discharging control unit 830 acquires, for example, the information around the lid portion 870 detected by at least any of the external sensor of the vehicle 800 and the external sensor of the power receiving and feeding apparatus.

In S9206, it is determined whether F_CHCOP is 0. If F_CHCOP is 0, the process proceeds to S9208. If F_CHCOP is not 0, the lid portion 870 is already in the open state. Therefore, the process ends. In S9208, it is determined whether there is an obstacle around the lid portion 870 of the power receiving and feeding outlet 860. If it is determined that there is an obstacle, an obstacle removal process is executed (S9210). If it is determined that there is no obstacle, the lid portion driving unit 880 is caused to open the lid portion 870. Then, the process ends.

FIG. 30 schematically illustrates an example of a power receiving and feeding outlet lid closing control process 930. The process illustrated in FIG. 30 may be mainly performed by the controller of the charging and discharging control unit 830.

In S9302, the state of the lid portion 870 of the power receiving and feeding outlet 860 is acquired. In S9304, information around the lid portion 870 of the power receiving and feeding outlet 860 is acquired. The charging and discharging control unit 830 acquires, for example, the information around the lid portion 870 detected by at least any of the external sensor of the vehicle 800 and the external sensor of the power receiving and feeding apparatus.

In S9306, it is determined whether F_CHCOP is 1. If F_CHCOP is 1, the process proceeds to S9308. If F_CHCOP is not 1, the lid portion 870 is already in the closed state. Therefore, the process ends. In S9308, it is determined whether there is an obstacle around the lid portion 870 of the power receiving and feeding outlet 860. If it is determined that there is an obstacle, an obstacle removal process is executed (S9310). If it is determined that there is no obstacle, the lid portion driving unit 880 is caused to close the lid portion 870 (S9312). Then, the process ends.

While the embodiments of the present invention have been described, the technical scope of the invention is not limited to the scope described in the above embodiments. It is apparent to persons skilled in the art that various alterations and improvements can be added to the above-described embodiments. It is apparent from the description of the appended claims that embodiments with such changes or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order. The power receiving and feeding apparatus described in the claims or the embodiments only needs to enable either the power receiving or the power feeding, and does not necessarily refer to an apparatus that bidirectionally performs power receiving and feeding. Accordingly, the power receiving and feeding apparatus may be a charging apparatus in the related art that does not perform the power feeding.

EXPLANATION OF REFERENCES

100: power receiving and feeding equipment, 102: power receiving and feeding area, 110: connector moving unit, 112: traveling rail, 114: saddle, 116: garter, 120: connector, 122: connector support portion, 124: strut, 130: rotating area, 200: power receiving and feeding equipment control unit, 202: position information acquisition unit, 204: vehicle information acquisition unit, 206: connector setting unit, 208: position determination unit, 212: performance determination unit, 214: movement instruction transmission unit, 218: movement control unit, 220: obstacle detection unit, 222: warning generation unit, 224: lid opening instruction transmission unit, 226: lid closing instruction transmission unit, 230: range determination unit, 232: history storage unit, 234: arrangement determination unit, 300: vehicle, 302: operation unit, 304: display unit, 306 wireless communication unit, 308: image capturing unit, 310: GNSS receiving unit, 312: sensor unit, 320: control device, 322: power receiving and feeding request transmission unit, 324: instruction receiving unit, 326: driving unit control unit, 328: movement instruction receiving unit, 330: movement control unit, 350: power storage device, 360: power receiving and feeding outlet, 370: lid portion, 380: lid portion driving unit, 400: power source line, 500: external server, 600: portable terminal, 710: connection determination process, 720: connection control process, 730: connection control process, 740: power receiving and feeding control process, 750: connector release control process, 760: connector release control process, 800: vehicle, 802: operation unit, 804: display unit, 806: wireless communication unit, 808: image capturing unit, 810: GNSS receiving unit, 812: sensor unit, 820: control device, 830: charging and discharging control unit, 850: power storage device, 860: power receiving and feeding outlet, 870: lid portion, 880: lid portion driving unit, 882: stroke sensor, 884: opening and closing switch, 901, 902, 903, 904, 905, 906: position, 910: power receiving and feeding outlet lid state determination process, 920: power receiving and feeding outlet lid opening control process, 930: power receiving and feeding outlet lid closing control process

What is claimed is:

1. An electric motor vehicle that includes a power storage device, the electric motor vehicle comprising:
a power receiving and feeding outlet configured to enable receiving and feeding of power between the power storage device and a power receiving and feeding apparatus that is provided outside the electric motor vehicle; and
a controller;
wherein the controller is configured to
drive a lid portion of the power receiving and feeding outlet,
receive a signal from the power receiving and feeding apparatus,
control the drive of the lid portion in response to the signal from the power receiving and feeding apparatus;
control the drive of the lid portion according to a monitoring result obtained by a monitoring unit configured to monitor a vicinity of the lid portion,
cause opening of the lid portion to be stopped, in a case where an obstacle exists around the lid portion when the lid portion is caused to be opened; and
transmit a movement instruction, when the obstacle is a vehicle, to the vehicle that is the obstacle, and
wherein the movement instruction includes an instruction to move the vehicle that is the obstacle to a position where the vehicle that is the obstacle is to be removed.

2. The electric motor vehicle according to claim 1, wherein
the controller is configured to close the lid portion of the power receiving and feeding outlet in response to the signal from the power receiving and feeding apparatus.

3. The electric motor vehicle according to claim 1, wherein
the controller is configured to open the lid portion of the power receiving and feeding outlet in response to the signal from the power receiving and feeding apparatus.

4. The electric motor vehicle according to claim 1, comprising:
the monitoring unit.

5. The electric motor vehicle according to claim 1,
wherein the monitoring unit is provided in the power receiving and feeding apparatus,
the electric motor vehicle being configured to receive the monitoring result obtained by the monitoring unit of the power receiving and feeding apparatus, and to control the drive of the lid portion driving unit according to the received monitoring result.

6. The electric motor vehicle according to claim 1,
the electric motor vehicle being configured to instruct the power receiving and feeding apparatus, when the obstacle is a power receiving and feeding connector of the power receiving and feeding apparatus, to move the power receiving and feeding connector.

7. The electric motor vehicle according to claim 1,
the electric motor vehicle being configured to output a warning when the obstacle is a person.

8. The electric motor vehicle according to claim 1,
wherein the power receiving and feeding apparatus includes:
a power receiving and feeding connector; and
a connection control device configured to drive the connector so as to control a connection between the connector and the power receiving and feeding outlet.

9. The electric motor vehicle according to claim 8,
wherein the connection control device is configured to perform the connection control of the connector after the lid portion is opened.

10. The electric motor vehicle according to claim 1, wherein the controller is configured to
transmit a power receiving and feeding request to the power receiving and feeding apparatus that has a connector moving unit configured to move, in a lateral direction and a vertical direction, a connector which is to be coupled to the power receiving and feeding outlet;

receive a lid opening instruction to open a lid portion of the power receiving and feeding outlet, the lid opening instruction being transmitted by the power receiving and feeding apparatus that has received the power receiving and feeding request; and open the lid portion of the power receiving and feeding outlet in response to receiving the lid opening instruction.

11. The electric motor vehicle according to claim 10, wherein the controller is configured to:

receive a lid closing instruction to close the lid portion from the power receiving and feeding apparatus, and close the lid portion in response to receiving the lid closing instruction.

12. The electric motor vehicle according to claim 1, wherein the controller is configured to:

transmit a power receiving and feeding request to the power receiving and feeding apparatus that has a connector moving unit configured to move, in a lateral direction and a vertical direction, a connector which is to be coupled to the power receiving and feeding outlet;

receive a movement instruction transmitted by the power receiving and feeding apparatus when the power receiving and feeding apparatus which has received the power receiving and feeding request determines that power receiving and feeding of the electric motor vehicle is not possible to perform, based on a position of the power receiving and feeding outlet and a situation around the electric motor vehicle; and cause the electric motor vehicle to move according to the received movement instruction.

* * * * *